(12) United States Patent
Kaplanyan et al.

(10) Patent No.: US 10,846,888 B2
(45) Date of Patent: Nov. 24, 2020

(54) SYSTEMS AND METHODS FOR GENERATING AND TRANSMITTING IMAGE SEQUENCES BASED ON SAMPLED COLOR INFORMATION

(71) Applicant: Facebook Technologies, LLC, Menlo Park, CA (US)

(72) Inventors: Anton S. Kaplanyan, Redmond, WA (US); Anton Sochenov, Redmond, WA (US); Thomas Sebastian Leimkuhler, Redmond, WA (US); Warren Andrew Hunt, Woodinville, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 191 days.

(21) Appl. No.: 16/191,776

(22) Filed: Nov. 15, 2018

(65) Prior Publication Data
US 2020/0098139 A1    Mar. 26, 2020

Related U.S. Application Data

(60) Provisional application No. 62/736,991, filed on Sep. 26, 2018.

(51) Int. Cl.
*G06K 9/00* (2006.01)
*G06T 9/00* (2006.01)
(Continued)

(52) U.S. Cl.
CPC .............. *G06T 9/002* (2013.01); *G06F 3/013* (2013.01); *G06K 9/3233* (2013.01); *G06N 20/00* (2019.01);
(Continued)

(58) Field of Classification Search
CPC .......... G06T 9/002; G06T 15/06; G06T 7/90; G06T 9/001; G06T 2207/20081; G06N 20/00; G06F 3/013; G06K 9/3233
See application file for complete search history.

(56) References Cited

U.S. PATENT DOCUMENTS 9,626,798 B2 * 4/2017 Zavesky .............. G11B 27/036
10,284,789 B2 * 5/2019 Banik .............. H04N 5/232933
(Continued)

OTHER PUBLICATIONS

Arjovsky, et al., Wasserstein GAN, arXiv:1701.07875v3, [stat.ML], Dec. 6, 2017, pp. 1-32.
(Continued)

*Primary Examiner* — Phuoc Tran
(74) *Attorney, Agent, or Firm* — Baker Botts L.L.P.

(57) ABSTRACT

In one embodiment, a method for generating completed frames from sparse data may access sample datasets associated with a sequence of frames, respectively. Each sample dataset may comprise incomplete pixel information of the associated frame. The system may generate, using a first machine-learning model, the sequence of frames, each having complete pixel information, based on the sample datasets. The first machine-learning model is configured to retain spatio-temporal representations associated with the generated frames. The system may then access a next sample dataset comprising incomplete pixel information of a next frame after the sequence of frames. The system may generate, using the first machine-learning model, the next frame based on the next sample dataset. The next frame has complete pixel information comprising the incomplete pixel information of the next sample dataset and additional pixel information generated based on the next sample dataset and the spatio-temporal representations retained by the model.

20 Claims, 15 Drawing Sheets

(51) Int. Cl.
*G06T 15/06* (2011.01)
*G06T 7/90* (2017.01)
*G06F 3/01* (2006.01)
*G06K 9/32* (2006.01)
*G06N 20/00* (2019.01)

(52) U.S. Cl.
CPC .............. *G06T 7/90* (2017.01); *G06T 9/001* (2013.01); *G06T 15/06* (2013.01); *G06T 2207/20081* (2013.01)

(56) References Cited

U.S. PATENT DOCUMENTS

| | | |
|---|---|---|
| 2004/0042662 A1 | 3/2004 | Wilensky |
| 2016/0239711 A1 | 8/2016 | Gong |
| 2017/0103264 A1* | 4/2017 | Javan Roshtkhari ........ G06K 9/6215 |
| 2018/0007269 A1 | 1/2018 | Sclar |
| 2018/0129902 A1 | 5/2018 | Li |
| 2018/0137389 A1 | 5/2018 | Mathieu |

OTHER PUBLICATIONS

Chaitanya, et al., Interactive Reconstruction of Monte Carlo Images Sequences Using a Recurrent Denoising Autoencoder, ACM Trans. Graph. 36, 4, Article 98, Jul. 2017, pp. 1-14. Supplemental material included. DOI: http://cLx.doiorg/10.1145/3072959.3073601.

Chen, et al., Photographic Image Synthesis with Cascaded Refinement Networks, arXiv:1707.09405v1, [cs.CV], Jul. 28, 2017, pp. 1-10.

Goodfellow, et al., Generative Adversarial Nets, arXiv:1406.2661v1, [stat.ML], Jun. 10, 2014, pp. 1-9.

Guenter, et al., Foveated 3D Graphics, Sep. 17, 2014, pp. 1-10.

Liu, et al., Image Inpainting for Irregular Holes Using Partial Convolutions, arXiv:1804.07723v2, [cs.CV] Dec. 15, 2018, pp. 1-23. https://arxiv.org/abs/1804.07723.

Miyato, et al, Spectral Normalization for Generative Adversarial Networks, arXiv:1802.05957v1, [cs.LG], Feb. 16, 2018, pp. 1-26.

Patney, et al., Towards Foveated Rendering for Gaze-Tracked Virtual Reality, ACM Trans. Graph., Nov. 2016, 35(6):1-15. With Supplementary documents.

Shi, et al., Convolutional LSTM Network: A Machine Learning Approach for Precipitation Nowcasting, arXiv:1506.04214v1, [cs.CV], Jun. 13, 2015, pp. 1-11. https://arxiv.org/abs/1506.04214v1.

Simonyan, et al., Very Deep Convolutional Networks for Large-Scale Image Recognition, arXiv: 1409.1556v6, [cs.CV], Apr. 10, 2015, pp. 1-14.

International Search Report and Written Opinion for International Application No. PCT/US2018/061942, dated Jun. 20, 2019.

* cited by examiner

US 10,846,888 B2

SYSTEMS AND METHODS FOR GENERATING AND TRANSMITTING IMAGE SEQUENCES BASED ON SAMPLED COLOR INFORMATION

PRIORITY

This application claims the benefit, under 35 U.S.C. § 119(e), of U.S. Provisional Patent Application No. 62/736,991, filed 26 Sep. 2018, which is incorporated herein by reference.

TECHNICAL FIELD

This disclosure generally relates to machine-learning, computer graphics, and image compression.

BACKGROUND

"Computer graphics" refers to computer-generated image data (including still images and videos) created using graphics hardware and software. Computer graphics, especially ones with high-resolution and/or high-frame-rate, are computationally costly to generate. For example, to generate a single image with 1920×1080 resolution means that the colors of more than 2 million pixels need to be determined. To generate a video with 60 frames-per-second (fps), the number of pixels needed every second quickly approaches 125 million. Moreover, typical 3-dimensional (3D) computer graphics are rendered by applying physics-based rendering models (e.g., ray tracing or ray casting techniques) on 3D models of virtual environments. The complexity of the 3D models, as well as the complexity of the physics-based rendering models, add to the rendering cost. In addition, in certain applications, the fully rendered images may need to undergo post-processing to create the desired visual effects (e.g., blurring), which further adds to the overall computational cost.

In addition to computational costs, the size of image data can also be taxing on system resources, regardless of whether the image data is computer-generated or recorded by cameras or other devices (e.g., such as movies or video clips streamed online or transmitted via a peer-to-peer connection). For example, a high-resolution image could easily exceed 10 megabytes and a high-frame-rate video that is a few minutes long could be measured in gigabytes. Thus, even for images or videos that are pre-generated (e.g., pre-generated computer graphics or pre-recorded images or videos captured using cameras), which impose less real-time computational constraints, their file sizes could still present a technical bottleneck, especially when it comes to data transmission (e.g., over the Internet, cellular data, short-range wireless communication, etc.).

As such, depending on the particular application in which computer graphics are needed, the high computational cost for generating and/or transferring the image data often restrict the level of image quality that can be used in practice. For example, in real-time applications (e.g., 360-degree videos and panoramas, gaming, virtual reality, or augmented reality) or applications where the computing environment has limited system resources (e.g., processing power, memory, storage, or transmission bandwidth), image quality may need to be sacrificed in order to meet the runtime requirements of those applications.

SUMMARY OF PARTICULAR EMBODIMENTS

Figure 1:
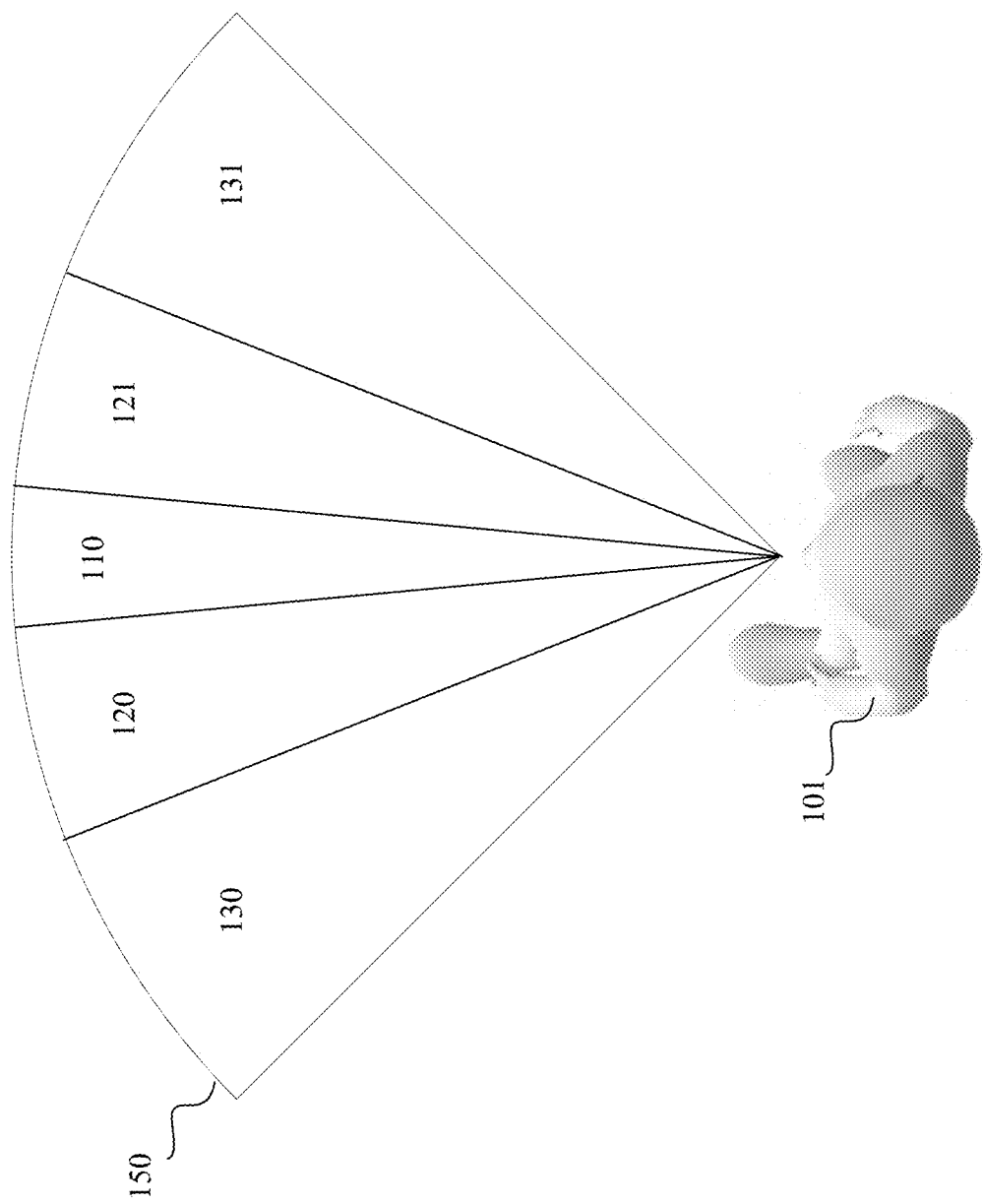
FIG. 1 provides a simplified diagram showing the discrepancy of a person's visual acuity over his field of view.

Embodiments described herein relate to a machine-learning approach for generating and/or compressing and reconstructing perceptively-accurate images (e.g., including video frames) based on a sequence of video frames with incomplete pixel information (e.g., sparse sample datasets of pixel color). Since perceptively-accurate images can be generated from sparse sample datasets using machine learning, the computationally more expensive rendering pipeline (e.g., using ray tracing, ray casting, or other physics-based computer-graphics techniques) may only be needed for a sparse subset of the total pixels in the image. As such, the embodiments described herein significantly reduce the overall computational cost, time, and system resources needed to generate images. In addition, since complete images can be reconstructed from their sample datasets using the embodiments descried herein, applications that need to transmit image data may transmit the corresponding sample datasets rather than complete pixel information, thereby significantly reducing transmission costs. As an example, experiments have shown that the embodiments described herein can reduce rendering cost and transmission bandwidth by roughly two orders of magnitude.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Rendering and/or transmitting high-resolution and high-frame-rate videos is a costly process. To ameliorate that cost, embodiments described herein enable applications to render/transmit only a small subset of the pixels in a video according to the visual acuity of humans and generate/reconstruct the complete video using neural networks.

Particular embodiments take advantage of the visual acuity of humans. FIG. 1 provides a simplified diagram showing the discrepancy of a person's 101 visual acuity over his field of view 150. In this diagram, the center region 110 represents the person's 101 fovea view. The visual acuity of the person 101 decays farther away from the fovea view 110. For example, the person's 101 visual acuity in the neighboring regions 120 and 121 is less than that of the fovea view 110, and the visual acuity in regions 130 and 131 is worse still.

Observing that the acuity of the human visual system rapidly decays towards his/her peripheral vision, embodiments described herein are designed to render/transmit high pixel densities in the fovea view, while progressively and dramatically subsampling (referred to as "corruption") the spatio-temporal pixel volume in regions extending into the periphery. In doing so, the techniques described herein may significantly improve the time needed for generating and/or transmitting video frames. For example, in particular embodiments, rather than using traditional graphics pipelines to render every pixel of every frame, embodiments described herein allows rendering systems to generate a portion of the pixels using the more expensive rendering process (with higher concentration in the foveal region) and generate the rest using a machine-learning model (with higher concentration outside of the foveal region) that is computationally less expensive. In other embodiments, when transmitting videos, a transmitter may sample a portion of the original video frames based on the viewer's foveal region (e.g., pixels closer to the foveal region are more densely sampled than pixels farther away from the foveal region) and transmit only those samples to avoid having to transmit every pixel of the video. On the recipient device, the sparse pixel information received from the transmitter may be used to reconstruct the full video frame using a machine-learning model.

Figure 2A:
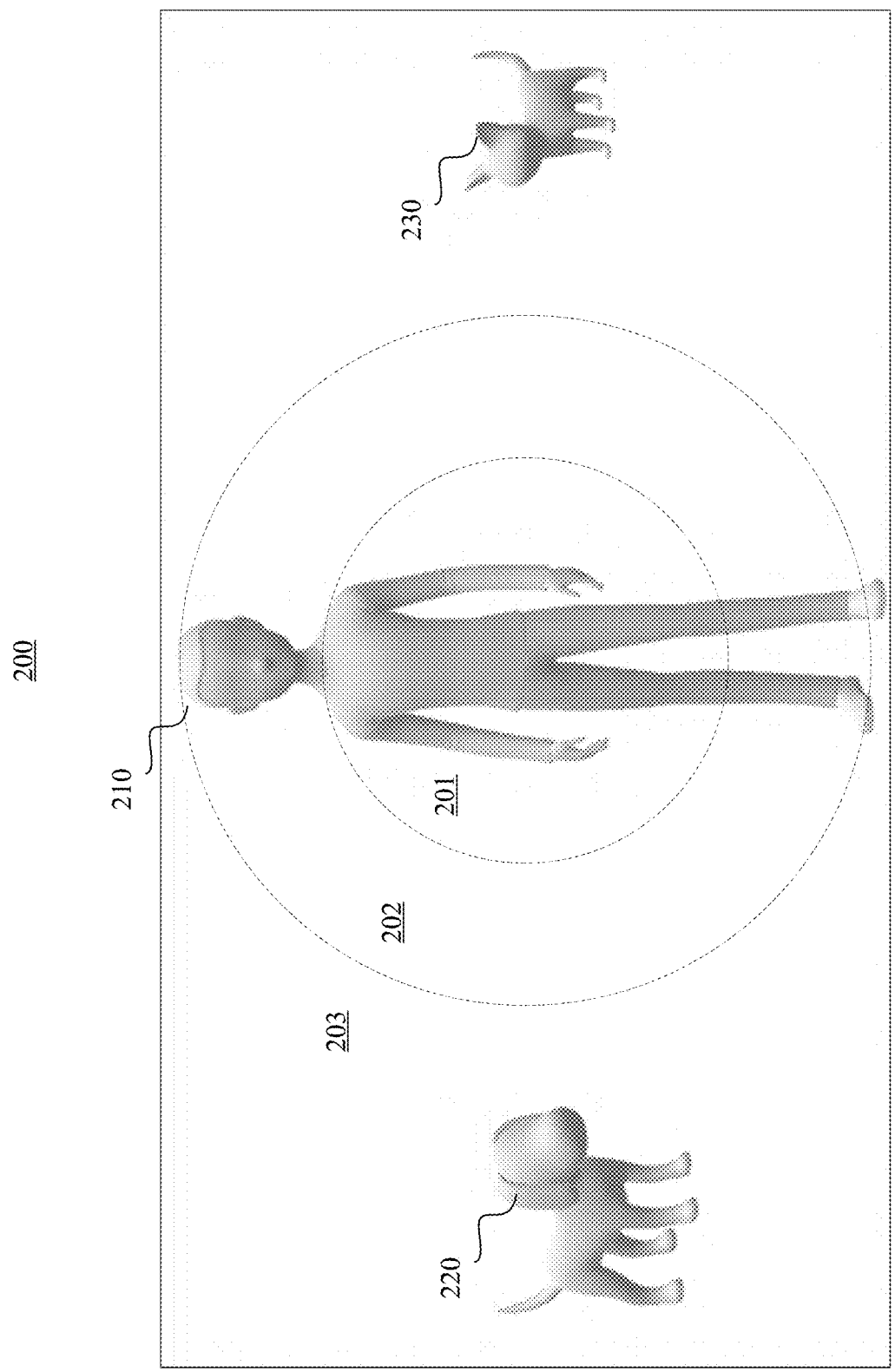
FIG. 2A illustrates the concept of foveated compression.
Figure 2B:
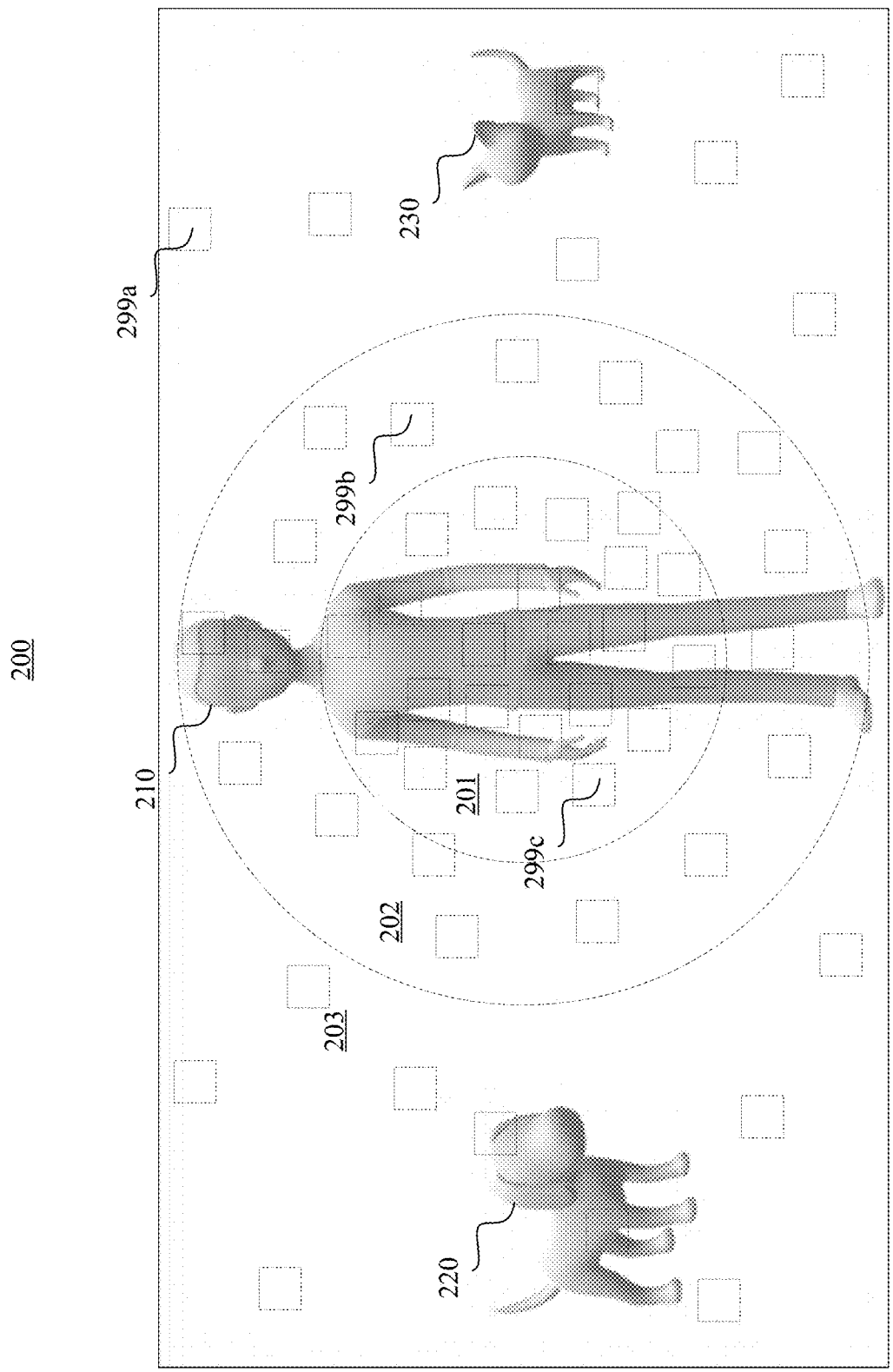
FIG. 2B illustrates an example of image sampling within a scene that takes advantage of a viewer's foveated vision, in accordance with particular embodiments.

FIGS. 2A and 2B illustrate the concept of foveated rendering and/or compression. FIG. 2A illustrates a scene 200 that is captured from or to be rendered for a particular viewpoint. The scene 200 contains a person 210 in the center of the viewpoint, a dog 220 to the left of the viewpoint, and a cat 230 to the right of the viewpoint. The dotted concentric circles are used to visually delineate the viewer's visual acuity. The region 201 within the smallest circle represents the foveal view of the viewer; the region 202 between the two circles represents a portion of the viewer's view that is farther from the foveal view; and the region 203 outside of the larger circle represents a portion of the viewer's view that is even farther from the foveal view.

FIG. 2B illustrates an example of image subsampling within the scene 200 that takes advantage of the viewer's foveated vision. In FIG. 2B, subsample locations are visually represented by the dotted squares (e.g., 299a, 299b, and 299c). As used herein, the term "subsampling" refers to the process of determining the color information for particular pixels (or sampling locations), which may be done by, for example, extracting pixel information from an existing image/frame (e.g., a pre-recorded movie or video clip) or rendering pixels of interest based on a 3D model via computer-graphics rendering. In particular embodiments, the density of the subsamples may directly correlate with the visual acuity of the viewer. For example, since the viewer's foveal view is centered at region 201, subsampling may be highly dense within that region 201. For regions that are farther away from the center of the foveal view of the viewer, progressively fewer or less dense subsamples may be obtained. For example, in FIG. 2B, the subsamples within region 202 are less dense than those within region 201 but denser than those within region 203. Since the visual acuity of the viewer is low in the periphery, having less subsample density in such regions would have minimal effect on the viewer's viewing experience. As will be described in further detail below, for areas where no subsamples are obtained, a machine-learning model may be used to approximate their color information. Since the viewer would not be able to see clearly in the periphery due to biological or lensing limitations anyway, having lower quality or less accurate color information in the corresponding image would not significantly impact, if at all, the viewer's viewing experience. This allows a graphics rendering system, for example, to selectively render pixels based on the viewpoint of the viewer (e.g., the foveal view may be assumed to be in the center or detected by an eye-tracking device) and avoid having to render a complete image or frame, thereby saving significant computational resources and time. Similarly, a video transmission application (e.g., such as a video-streaming service or a video-sharing application on a mobile device) may selectively transmit a portion of the pixels based on the viewpoint of the viewer and have the rest of the pixels reconstructed on the recipient device to avoid transmitting every pixel in the video sequence.

As mentioned above, the missing or unsampled portions of an image, such as a frame in a sequence of video frames, may be reconstructed using a machine-learning model. The machine-learning model may reconstruct the missing information based on the subsamples available for the current frame (the collection of subsamples for an image may be referred to as a sample dataset of that frame). In addition, particular embodiments of the machine-learning model may also retain spatio-temporal information of the scene from previous frames processed by the machine-learning model. Spatio-temporal information from previous frames is a good source of information for reconstructing the current frame because video sequences exhibit high redundancy in space and particularly over time. Thus, if the subsamples from previous frames are at different locations (e.g., randomly or pseudo-randomly sampled) and/or the scene has changed slightly between frames, the aggregate spatio-temporal information overtime would help the machine-learning model reconstructing missing pixel information for the current frame.

Figure 3A:
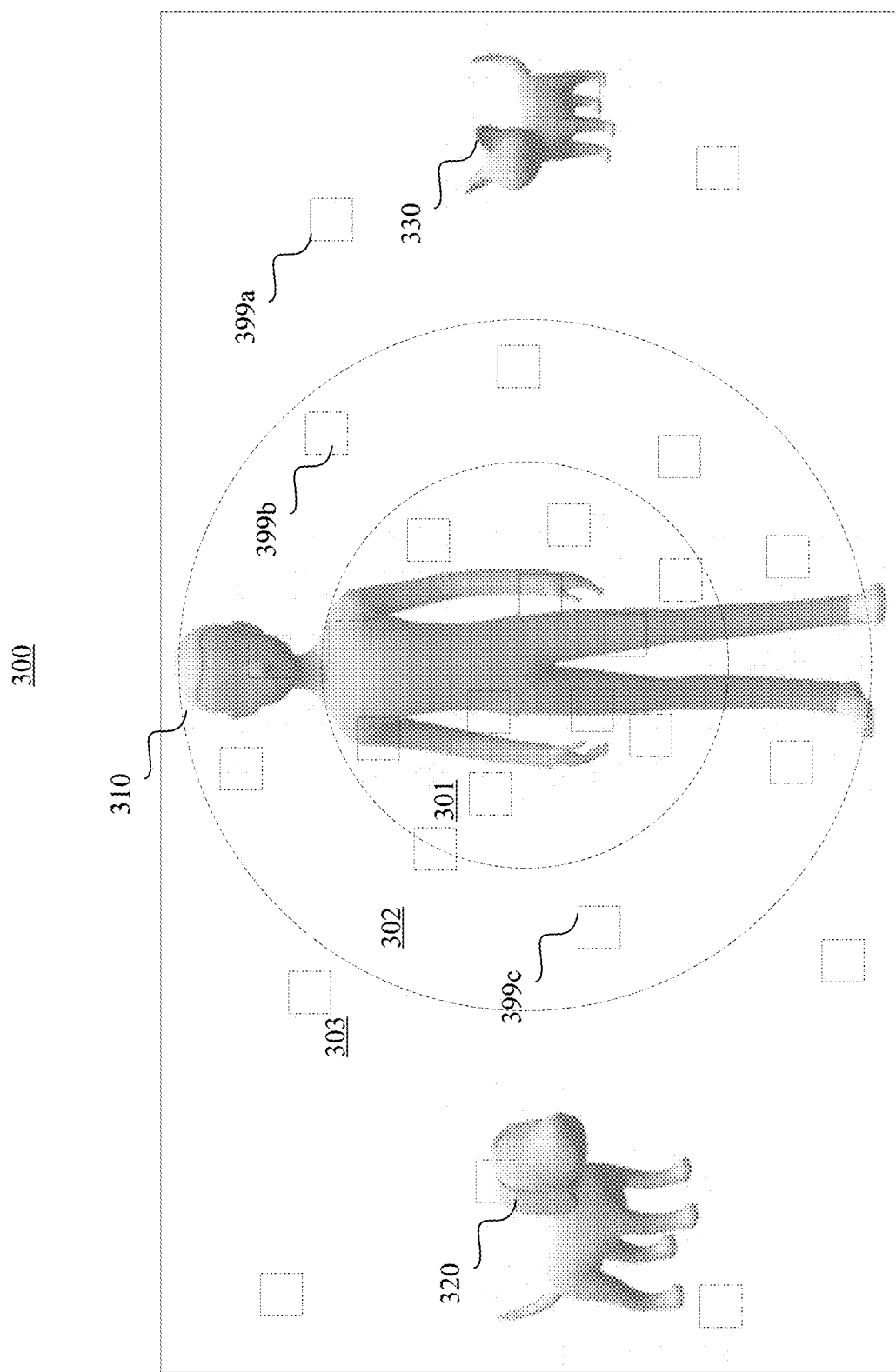
FIGS. 3A-B illustrate an example where image sampling per video frame may be further reduced due to the availability of spatial data across a sequence of frames, in accordance with particular embodiments.
Figure 3B:
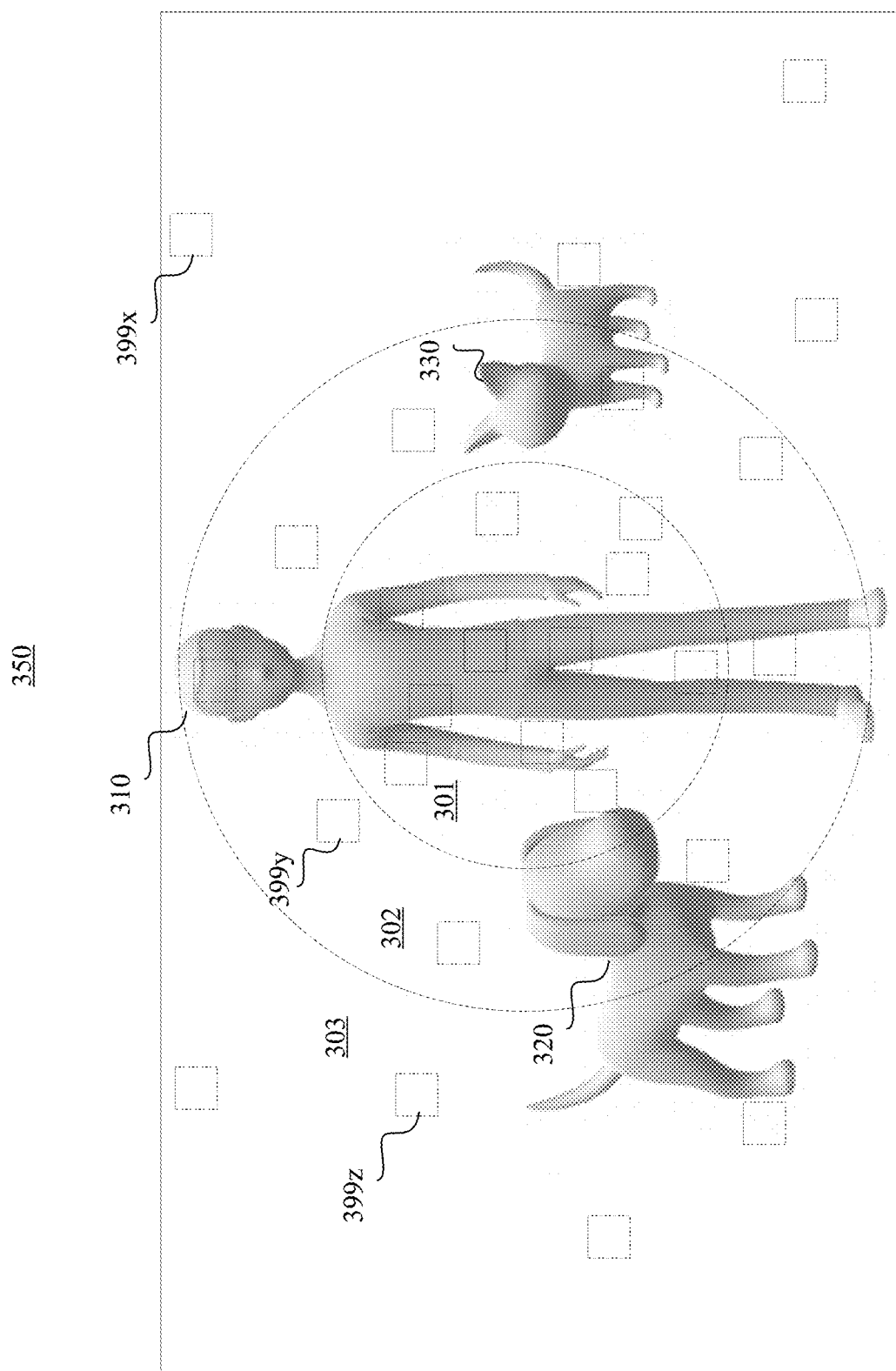

FIGS. 3A-B illustrate an example where image sampling per video frame may be further reduced due to the availability of spatial data across a sequence of frames, in accordance with particular embodiments. FIG. 3A illustrates a scene 300 that contains a person 310, a dog 320 on the left, and a cat 330 on the right, similar to the one 200 shown in FIGS. 2A-B. In a similar manner, region 301 within the smallest circle represents the foveal view of the viewer; the region 302 between the two concentric circles represents a portion of the viewer's view that is farther from the foveal view; and the region 303 outside of the larger circle represents a portion of the viewer's view that is even farther from the foveal view. Subsample locations (e.g., 399a, 399b, and 399c) are visually represented by the dotted squares. In FIG. 3A, the subsamples are the densest within region 301, less dense in region 302, and the least dense in region 303.

FIG. 3B illustrates another scene 350 in a sequence of scenes that comprises the one 300 shown in FIG. 3A. As an example, the scene 300 shown in FIG. 3A may temporally precede the scene 350 FIG. 3B. Compared to scene 300 in FIG. 3A, the dog 320 and cat 330 in scene 350 have moved closer to the person 310 and forward towards the viewpoint. Despite these changes, the two scenes 300 and 350 contains redundant information. For example, the person 310 in both scenes 310 and 350 remained in place and may appear identical. Although the dog 320 and cat 330 moved between scenes, their appearance information is still captured in both scenes. As such, a machine-learning model in accordance with particular embodiments may be trained to use sample datasets from both scenes 300 and 350 to reconstruct any missing pixel information for a particular frame. Since the machine-learning model could obtain information from the sample datasets associated with multiple scenes, the sample dataset for each of the scene may be sparser than what would otherwise be needed. For example, compared to FIG. 2B, the subsample in FIGS. 3A and 3B are less dense. In particular embodiments, to improve coverage of different areas or objects within the scene, the subsample locations may vary from scene to scene. For example, the subsample locations for scene 350 (e.g., 399x, 399y, 399z) are different from the subsample locations for scene 300. While the example shown in FIGS. 3A-B shows objects in the scene changing positions, the same principle described above would apply equally to scene changes that are due to changes in the viewer's viewpoint (e.g., the viewer may be moving) or a combination of changes in the viewer's viewpoint and changes in object positions.

Figure 4:
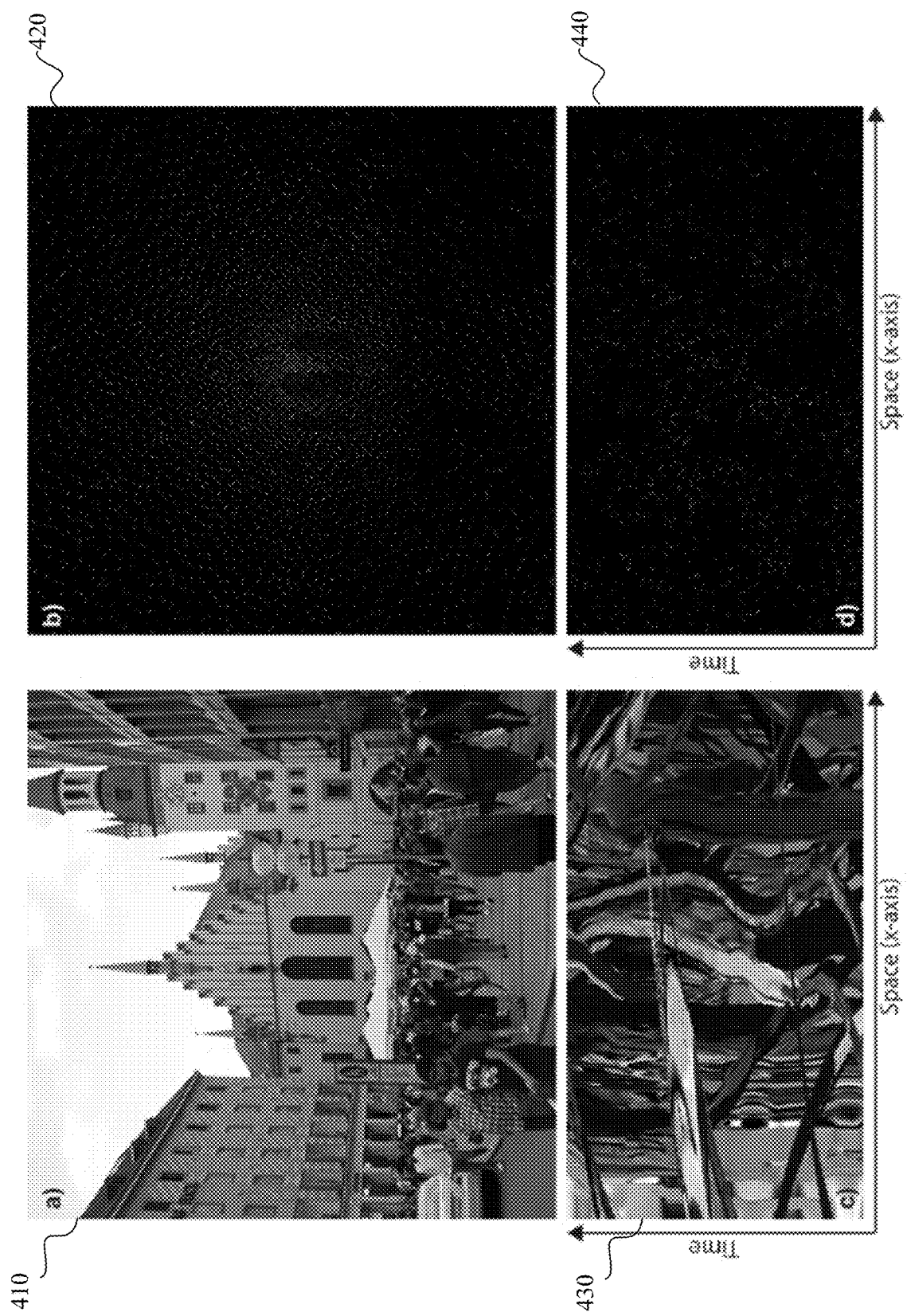
FIG. 4 illustrates an example of an image and a corresponding sampling dataset, along with a visual depiction of their space-time data.

FIG. 4 illustrates an example of an image 410 and a visual representation of a corresponding sampling dataset 420, along with a visual depiction of their space-time data 430 and 440, respectively. In the example shown, the image 410, which may be a frame in a video sequence, contains high pixel density throughout the image. The sampling dataset 420 is generated based on subsampling of the pixels in image 410 (the sampling dataset 420 may also be referred to as a corruption of the image 410). The visual representation of the sampling dataset 420 contains color information of pixels that have been sampled, with unsampled regions painted black. The light-colored dots shown in the visual representation 420 correspond to light-colored pixels in image 410 that are in high contrast with the black unsampled regions. Dark-colored pixels may not be easily distinguishable in this particular visual representation 420 because the unsampled regions are painted black, but nevertheless, the dark-colored pixels have been sampled and exist in the sampling dataset 420. In this example, the viewer's foveal region is centered in image 410, and consequently, the subsampling in the center region is denser, as represented by the denser pattern of dots in the center region of sampling dataset 420. The density of the dots gets progressively sparser in regions farther away from the center.

As discussed above, video sequences typically exhibit high redundancy in space and particularly over time. Image 430 illustrates this by plotting the pixels across a horizontal line of the scene shown in image 410 over time (the vertical axis). The seemingly elongated, albeit distorted, color information across time provides a visual indication that the same pixel information is available across different times. The corresponding sampling dataset 440 for the image 430 shows that the subsample locations, when aggregated over time, provide adequate sampling coverage of each spatial region. By leveraging the redundant information encoded within a sequence of frames, subsamples—even when sparse—provide sufficient information for a machine-learning model to reconstruction or in-paint the missing video content in such a way that the reconstruction appears plausible to indistinguishable when observed under peripheral vision.

Efficiency is a desirable feature of the reconstruction algorithm used by the machine-learning model. In particular, the execution of the algorithm should significantly save computation and power compared to the naïve solution of rendering/transmitting the full video content. Rendering full video content means that each pixel of each video frame needs to be rendered (e.g., via ray tracing visibility tests, shading, etc.) and transmitting full video content means that every pixel information (whether or not it is encoded or compressed) is transmitted. Both of these operations could be resource-intensive in terms of processing power and time, memory, storage, transmission bandwidth, etc. The reconstruction algorithm described herein provides significant savings in these areas by reducing the number of pixels that need to be rendered/transmitted and using a machine-learning model to reconstruct the rest.

Particular embodiments may be designed to have access to current and past information. For example, as described with reference to FIGS. 3A-B, sampling datasets associated with past frames (e.g., corresponding to scene 300) may be used along with the current sampling dataset (e.g., corresponding to scene 350) to reconstruct the missing unsampled portions of the current frame of interest. In particular embodiments, the reconstruction system may be communicatively coupled to an eye-tracking system and therefore could dynamically determine the current eye position of the viewer to determine which areas to sample more and which areas to sample less.

In particular embodiments, the machine-learning model may be a recurrent neural network that is trained to perform the reconstruction task. In particular embodiments, the network may be a generative adversarial network (GAN). Deep learning algorithms continually show results of unprecedented quality in the realm of image synthesis and analysis. Due to their fixed-function pipeline, they are highly amenable to execution on hardware. Therefore, they are a natural choice for the problem at hand.

Figure 5:
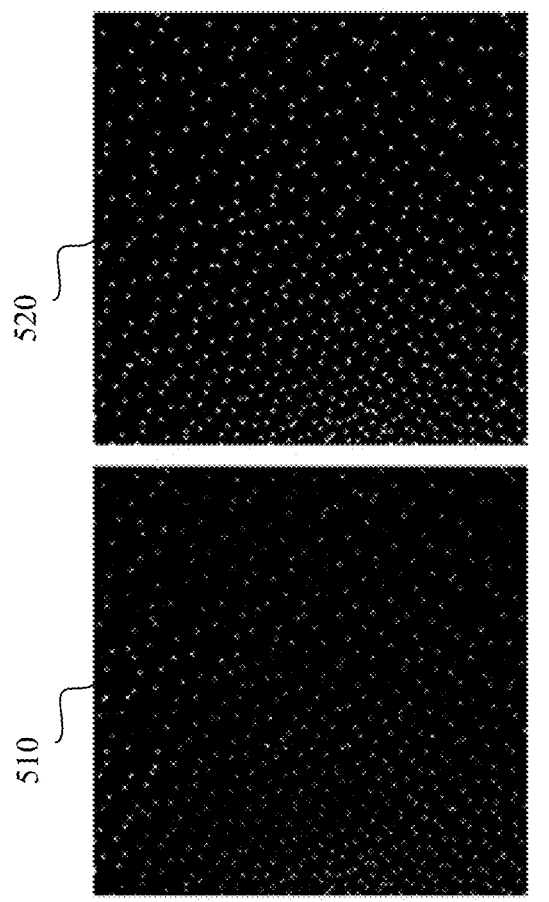
FIG. 5 illustrates an example sampling dataset that includes RGB pixel samples and a binary mask indicating their locations.

Before describing the machine-learning model in detail, the input to the model will be described. FIG. 5 illustrates an example sampling dataset that includes RGB pixel samples 510 and a binary mask 520 indicating their locations. Both the pixel samples 510 and the binary mask 520 may be derived from or associated with the same frame. The RGB pixel samples 510 may be generated by sampling an existing frame or rendering particular pixel samples via any suitable computer-graphics rendering pipeline. The subsample locations may depend on the viewing direction of the viewer and/or the configuration of the optics used for viewing the image (e.g., the optics used in a virtual-reality or augmented-reality headset). Regions that are closer to the viewer's foveal view or gaze direction may be more densely sampled, whereas regions farther away may be less densely (or more sparsely) sampled. In particular embodiments, based on the desired subsample density for each region, the system may randomly determine the subsample locations and determine the corresponding colors. In particular embodiments, the subsample locations may be stored using a binary mask 520. The binary mask 520 may have pixel locations that correspond to the RGB pixel samples 510. Each pixel in the binary mask 520 may indicate whether that pixel is sampled or unsampled (e.g., 0 may indicate an unsampled pixel and 1 may indicate a sampled pixel, or vice versa). Since a sampled pixel may have the same color value as that of an unsampled region, the binary mask may be used to disambiguate such scenarios (e.g., a sampled color of black may have an associated value of 0, which would conflate with the default 0 value of an unsampled region). In particular embodiments, the sampled RGB colors and the binary mask may be stored in four channels of an image (e.g., the RGB color information may be stored in the RGB channels of the image, and the binary mask information may be stored in the alpha channel of the image).

Figure 6:
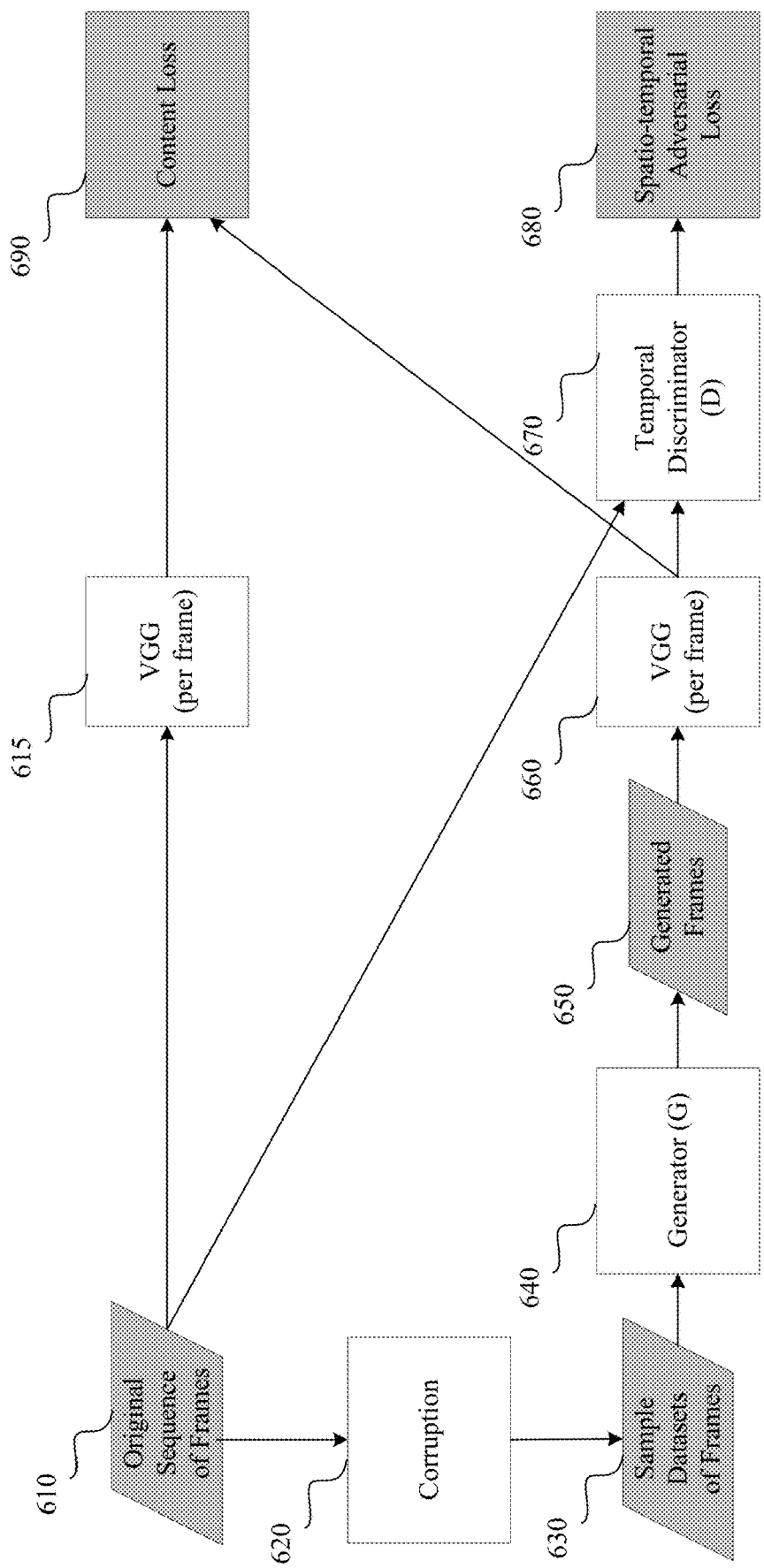
FIG. 6 illustrates an example training configuration for a generative adversarial network, in accordance with particular embodiments.

FIG. 6 illustrates an example training configuration for a generative adversarial network (GAN), in accordance with particular embodiments. The GAN may include a generator 640 and a discriminator 660. At a high-level, the generator 640 may be configured to generate or reconstruct a "fake" image that has portions in-painted for missing pixel information. The discriminator 660, on the other hand, may be configured to assess whether a given image is "fake" (or generated by the generator 640) or "real" (or not generated by the generator 640). During training, the high-level goal is to improve the generator's 640 ability to generate "fake" images that can fool the discriminator 660 and concurrently improve the discriminator's 660 ability to detect "fake" images generated by the generator 640. The goal at the end of training is for the generator 640 to generate realistic "fake" images. Thus, once training is complete, the generator 640 (and not the discriminator 660) could be put into operation during inference time and generate or reconstruct video frames.

In particular embodiments of the training process, the training samples used for training the GAN network may be a sequence of frames 610, each having complete pixel information (such as 410 in FIG. 4). The sequence of frames 610 may be a temporal sequence of views of a scene as captured by a video camera or rendered using computer graphics. In particular embodiments, the sequence of frames 610 may be processed by a corruption module 620. The corruption module 620 may sample each frame 610 and output a corresponding sample dataset 630 (such as 420 in FIG. 4 or the RGB image 510 and binary mask 520 shown in FIG. 5). Each sample dataset 630 for a frame may contain sparse, incomplete pixel information, with regional densities dependent on the viewer's gaze direction (or foveal region).

In particular embodiments, the sample datasets 630 may be used to train a GAN network. The sample datasets 630 may be input into a generator 640. The generator 640 may comprise neural networks whose parameters may be updated/trained during the training process. The generator 640 may output a sequence of generated frames 650 (or reconstructed frames) that correspond to the original sequence of frames 610 as well as the associated sample datasets 630 of those frames. As previously mentioned, each sample dataset 630 includes sparse, incomplete pixel information. The corresponding generated frame 650 may have the missing pixel information filled in by the generator 640. Each of the generated frame 650 may also be considered as a "fake" image.

In particular embodiments, the generated frames are tested by the discriminator 670 and the results are used to train or update the neural networks of both the generator 640 and the discriminator 670. In particular embodiments, each frame of the original sequence of frames 610 may be processed by a pre-trained neural network, such as VGG convolutional neural networks or any other suitable network (e.g., ResNet), to extract image features. Similarly, each of the generated frames 650 may be processed by a pre-trained neural network 660 to extract their image features. In particular embodiments, the extracted image feature (by VGG network 615) of each original frame 610 may be compared with the extracted image feature (by VGG network 660) of the corresponding generated frame 650 to determine the content loss 690 (represented by $L_c$) of the generated frame 650. For example, if the generated frame 650 is very similar to the corresponding original frame 610, then the content loss 690 may be small (a desirable result). On the other hand, if the generated frame 650 is dissimilar to the corresponding original frame 610, the content loss 690 may be large (an undesirable result). In particular embodiments, the extracted feature of each generated frame 650 may be input into the discriminator 670, which would determine a likelihood of the input frame being "fake" (or generated by the generator 640). If the generated frame 650 looks natural (or not in-painted), the discriminator may be "fooled" into a determination that the generated frame 650 is "real" (or not generated by the generator 640). Similarly, the original frames 610 may also be input into the discriminator 670 so that it can determine whether the original frame 610 is "real" or "fake." The output of the discriminator 670 may be used to determine the adversarial loss 680 of the GAN network (represented by $L_a$). The adversarial loss 680 and the corresponding content loss 690 for the sequence of frames may be iteratively used as the loss function (represented by $L=L_c+L_a$) to update the generator 640 and discriminator 670 so that each gets better performing their respective tasks (in other words, the parameters of the two networks are updated to reduce the loss in subsequent iterations). Once training completes (e.g., when the loss function is below a certain threshold or a sufficiently large set of training samples has been used to train the GAN network), the generator 640 may be used in inference time to generate or in-paint the missing pixel information of sparse frames.

In particular embodiments, the adversarial loss $L_a$ may be defined based on the Wasserstein distance and used to perform spectral normalization of the discriminator. In particular embodiments, the content loss $L_c$ may compare the extracted features (e.g., using VGG networks) per frame and perform additional temporal regularization. Content loss may be represented by the equation:

$$\mathcal{L}_c(\theta) = \sum_f \left( \sum_l \lambda_l \|\Phi_l(I_f) - \Phi_l(g(I'_f, \theta))\|_1 + \lambda_t \sum_l \lambda_l \left\| \frac{d\Phi_l(g(I'_f, \theta))}{dt} \right\|_1 \right)$$

where,
$I_f$ represents the original frame at frame f;
$I'_f$ represents the sample dataset or corrupted frame at frame f;
θ represents the trainable network parameters of the neural network;
$\Phi_l$ represents VGG network layer l;
g represents the generator network;
$\lambda_l$ represents the weights of the individual VGG layers; and
$\lambda_t$ represents the weight of the temporal regularization.

Conceptually, the loss function $L_c(\theta)$ can be divided into two parts. The first part, delineated by the first summation over the range of 1 values, represents content comparisons between the original frame $I_f$ and its corresponding generated frame $g(I'_f, \theta)$. More specifically, the equation computes the difference between each VGG layer l of the original frame $I_f$ and the corresponding VGG layer l output of the generated frame $g(I'_f, \theta)$, multiply the difference by the $\Delta_l$ weight of that VGG layer l, and sum the results for each VGG layer. Conceptually, the result represents how different the generated frame is from the corresponding original frame, and large differences should be penalized. The loss function further takes into temporal regularization using the portion of the equation delineated by the second summation over the range of 1 values. There, changes in the generated frame $g(I'_f, \theta)$ over time is measured. More specifically, changes in the generated frame $g(I'_f, \theta)$ over time as output by each VGG layer l are weighted by their respective $\Delta_l$ weights and aggregated. Conceptually, since the frames are sequences in a video, excessive differences between sequentially generated frames should be penalized. During training, the network parameters θ may be updated to minimize the content loss defined in this manner.

After training completes, the generator 640 may be used in operation (or at inference time) to complete full video frames based on sparse pixel data. In particular embodiments, the generator 640 may be used to optimize foveated rendering for computer graphics applications and/or foveated compression for image transmission applications. With respect to foveated rendering, the generator 640 may be used to improve the speed at which computer graphics are generated. For example, a computer-graphics application (e.g., an AR/VR application, game, etc.) may render sparse pixel data using any suitable rendering technique (e.g., physics-based rendering algorithms, such as ray tracing). The density of rendered pixels may be higher in regions closer to the foveal area than regions farther away from the foveal area (e.g., the foveal area may be determined based on an eye-tracking device or pre-determined based on the device's lens parameters or by the application). Instead of rendering the rest of the pixels in the same manner, the application may use the trained generator 640 to fill-in the missing pixel information. Even though the pixels generated by the machine-learning model (or generator 640) may be less accurate than what could be generated by the traditional rendering algorithm, there would be little or no perceptive difference to the viewer due to the viewer's foveal viewing limitations.

With respect to foveated transmission, particular embodiments may be used by a transmitter to effectively transmit less image data than would otherwise be required, thereby reducing transmission time. For example, a transmitter may be instructed to transmit a video to a receiver. The video may be a pre-stored video (e.g., a video captured by a camera, computer-generated animation, etc.) and contains a sequence of frames. The transmitter may sample each video frame based on the viewer's foveal region and only transmit the sampled pixel data to the receiver. Upon receiving the sampled pixel data, the receiver may reconstruct the full video frame using the trained generator 640. Again, even though the pixels generated by the machine-learning model (or generator 640) may be less accurate than the actual pixels in the original video frame, there would be little or no perceptive difference to the viewer due to the viewer's foveal viewing limitations.

Figure 7A:
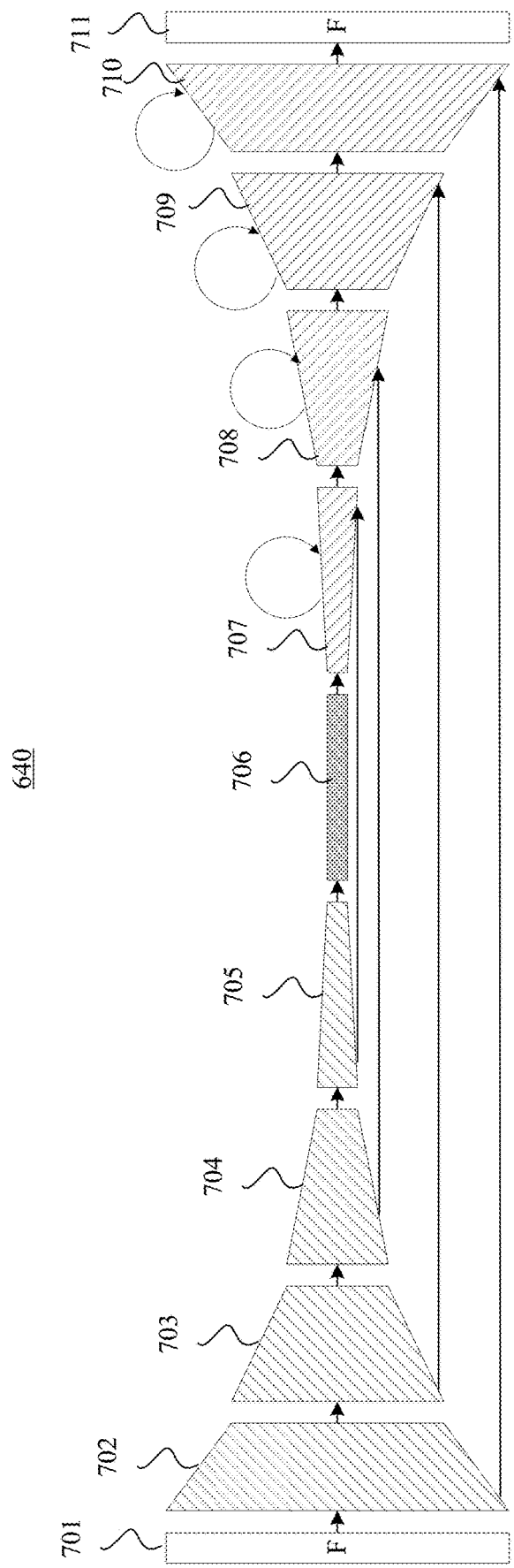
FIGS. 7A-D illustrate example components of a generator machine-learning model, in accordance with particular embodiments.

Further details of the network architecture of the generator and discriminator are now described. FIGS. 7A-D illustrate example components of a generator 640, in accordance with particular embodiments. FIG. 7A illustrates the high-level architecture of the generator 640. In particular embodiments, the generator 640 of the system may be an autoencoder that includes four matching encoders (e.g., 702, 703, 704, and 705) and decoder (e.g., 707, 708, 709, 710) blocks and a bottleneck block 706. While four pairs of matching encoders and decoders are illustrated in this example, any other number of pairs of matching encoders and decoders may also be used, such as three, five, seven, nine, etc. The wedge-shaped blocks indicate down-sampling and up-sampling. For example, the encoder blocks 702, 703, 704, and 705 are each represented by a wedge that starts wider on the left side than on the right, thereby representing down-sampling of the feature map. As a feature map is down-sampled, its spatial dimensions are reduced but gets deeper in the feature count. On the other hand, the decoder blocks 707, 708, 709, 710 are each represented by a wedge that starts narrower on the left side than on the right, thereby representing up-sampling of the feature map. The up-sampling process returns the reduced dimensionality of the feature maps to their original dimensions.

In particular embodiments, the generator 640 may take as input an image 701 containing a sample dataset of a frame (e.g., RGB and binary mask information). Four consecutive encoder blocks 702, 703, 704, 705 downscale the input RGB information in the spatial dimensions and increase the feature count. The input masks are handled using masked convolutions. The bottleneck block 706 processes the output of the last encoder layer 705 at low spatial resolution. The four matching decoder blocks 707, 708, 709, 710 perform spatial up-sampling, while decreasing the feature count. In particular embodiments, the matching encoders and decoders are connected with skip connections (e.g., represented by the arrows between symmetrical matching blocks, such as blocks 702 and 710, blocks 703 and 709, blocks 704 and 708, and blocks 705 and 707). Thus, the input to each decoder block (e.g., 709) is the output of the previous block (e.g., 708) and the masked output of the corresponding encoder block (e.g., 703). Conceptually, the skip connections help each decoding block retain the features of the sampled pixel information (as isolated using the mask). Furthermore, the decoder blocks 707, 708, 709, 710 may be recurrent networks that retain their final activations over time (represented by the circular loop on each block), so that their previous output can be concatenated with their current input, establishing a recurrent system. This feature helps the network retain spatio-temporal representations learned from previous frames and use them to generate the current frame. Finally, the output of the last decoder block 710 is the generated frame 711.

Figure 7B:
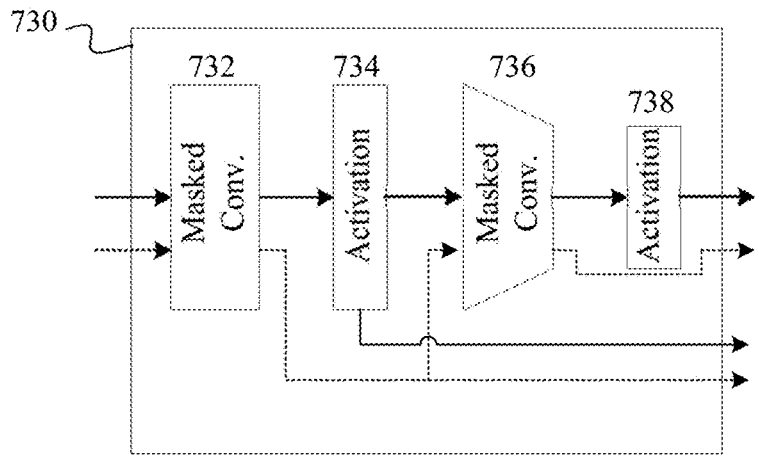

FIG. 7B provides details of an encoder block 730 (e.g., 702, 703, 704, 705), in accordance with particular embodiments. The black arrows represent the processing flow of RGB information and the dotted arrows represent the processing flow of binary mask information. In particular embodiments, the RGB information (such as the feature map extracted from the input RGB sample) and the associated binary mask information may be processed by masked convolutional layer 732. The output feature map associated with RGB information is then processed by an activation layer 734. The output of the activation layer 734, along with the mask features output by the masked convolution layer 732, is then down-sampled by the masked convolution layer 736. From that layer 736, the output feature maps associated with RGB information is processed by another activation layer 738. The output of the activation layer 738 and the down-sampled mask features from the masked convolution layer 736 are then passed to the next encoder block or the bottleneck block 740. The pre-down-sampling output of the activation layer 734 and the mask features from the masked convolution layer 732 are passed, via a skip connection, to the corresponding matching decoder block, as shown in FIG. 7A.

Figure 7C:
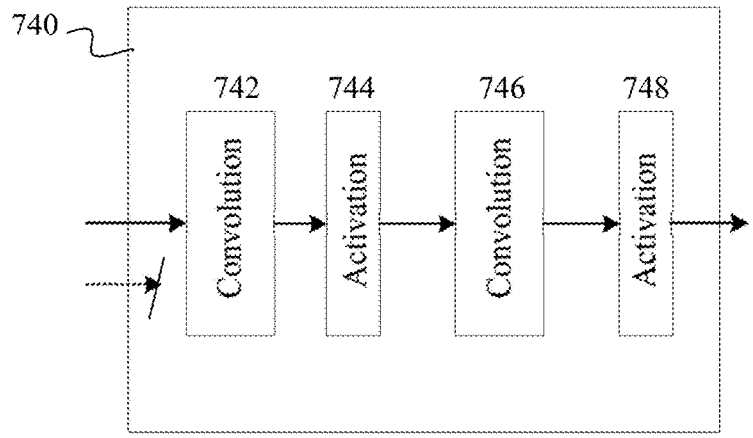

FIG. 7C provide further details of a bottleneck block 740 (e.g., 706), in accordance with particular embodiments. The bottleneck block 740 may take as input the outputs of the immediately preceding encoder block (e.g., 705 in FIG. 7A). The bottleneck block may process the down-sampled feature map associated with RGB information from the last encoder block 705 using a convolution layer 742. The output of that layer 742 is then processed by an activation layer 744, the output of which is processed by another convolution layer 746, and the output of which is processed by another activation layer 748. The output of the last activation layer 748 may then be output to the first decoder block 750 (e.g., 707 in FIG. 7A).

Figure 7D:
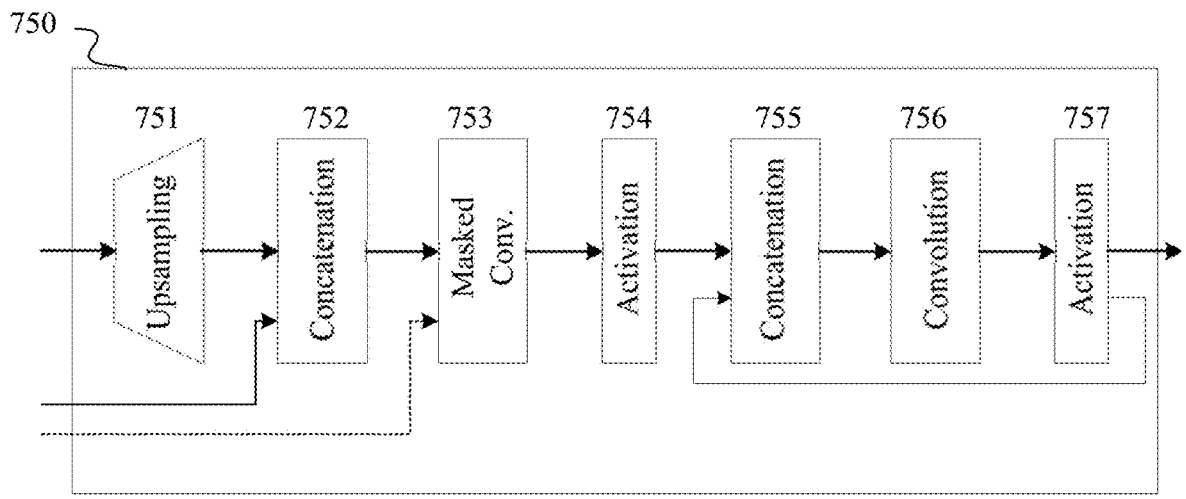

FIG. 7D provide further details of a decoder block 750 (e.g., 707, 708, 709, 710), in accordance with particular embodiments. Each decoder block 750 may take as input the feature map output of the immediately preceding block (e.g., another decoder block 750 or a bottleneck block 740). In addition, each decoder block takes as input the outputs of the matching encoder block 730 via the aforementioned skip connection. In particular, the skip connection sends the pre-down-sampled feature map associated with RGB information and the corresponding mask feature from the corresponding encoder block 730 to the decoder block 750. The input from the immediately preceding block is first up-sampled 751 and the result is concatenated with the pre-down-sampled feature map from the corresponding encoder 740. Thus, at the point of concatenation, both the feature map from the immediately preceding block and the one received via the skip connection are of the same dimension. The concatenated result is then processed by a masked convolution layer 753 using the mask feature received via the skip connection. The resulting feature map is then processed by an activation layer 754. The output of that layer 754 is then concatenated 755 with the activation output from the decoder block's 750 previous iteration. In this manner, the decoder block 750 retains its final activations over time to establish a recurrent system (in other words, the decoder block retains spatio-temporal information learned from other previous frames that it processed). The concatenated result then undergoes another convolution 756, and the output of which is processed by the final activation layer 757. The output of the activation layer 757 is then output to the next decoder block 750, if any, or output the final generated frame.

Figure 8A:
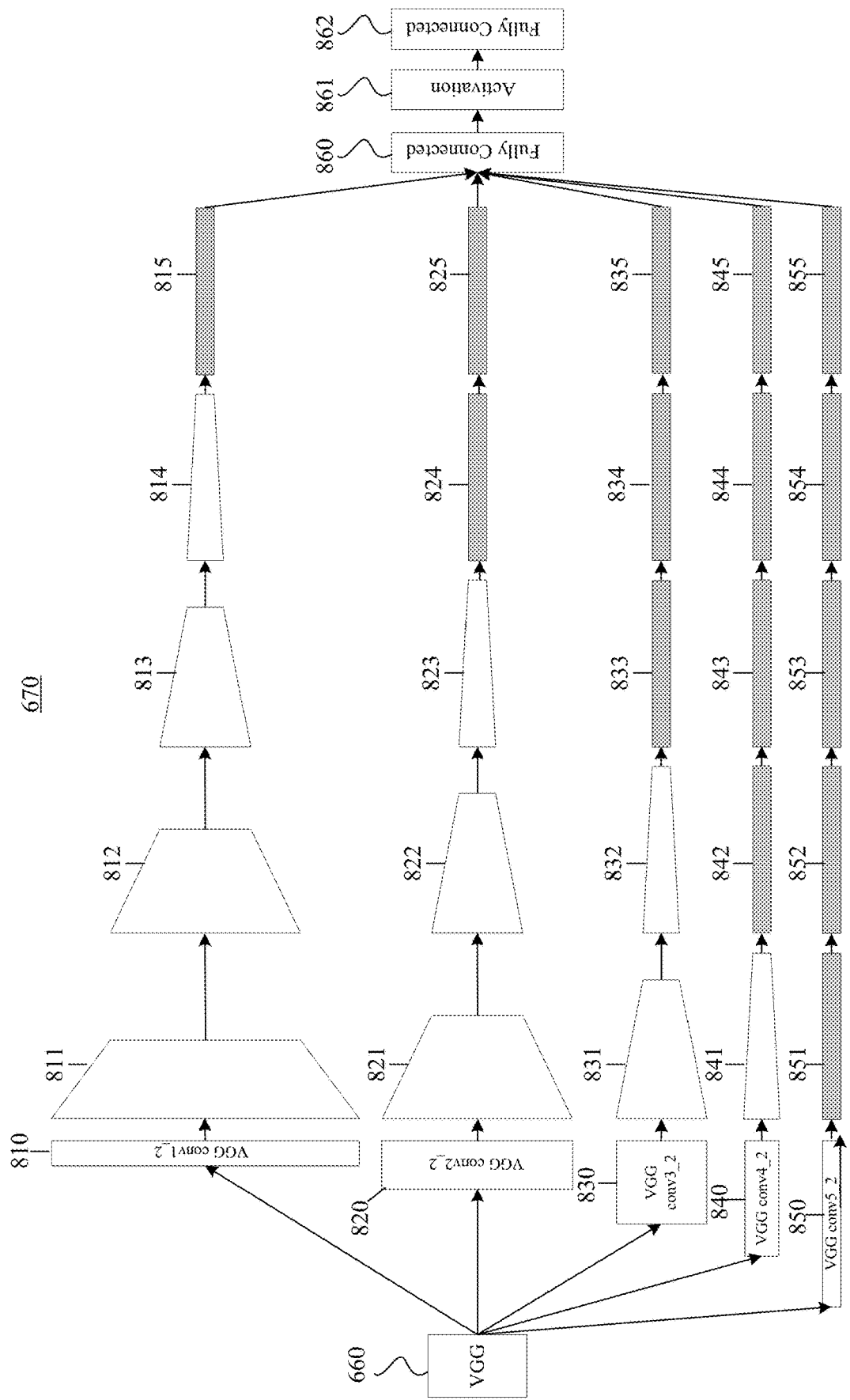
FIGS. 8A-C illustrate example components of a discriminator machine-learning model, in accordance with particular embodiments.
Figure 8B:
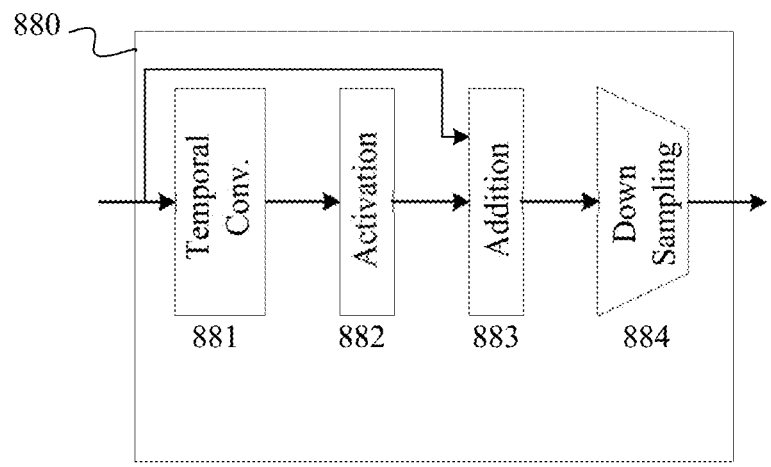
Figure 8C:
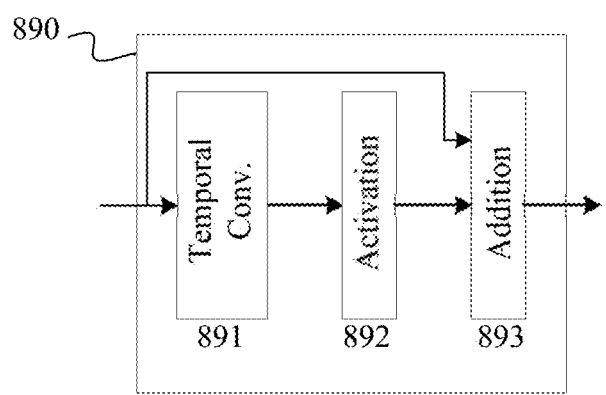

FIGS. 8A-C illustrate example components of a discriminator 670, in accordance with particular embodiments. FIG. 8A illustrates an embodiment of the discriminator's 670 architecture. In the embodiment shown, five intermediate layers of the pretrained VGG network 660 (e.g., VGG-19) are each fed into a sequence of temporal residual convolutional blocks, the outputs of which are combined to yield the final scalar critic (e.g., whether the input frame is "fake"). For specifically, as discussed above with reference to FIG. 6, the generated frame 650 from the generator 640 may be fed into a pretrained VGG network 660, and the output from which may be processed by the discriminator 670. Turning to the embodiment shown in FIG. 8A, the VGG neural network 660 may perform spatial reasoning on the input frame using multiple network layers. The output of each layer of the VGG neural network 660 corresponds to a different level of abstraction of the generated frame.

In particular embodiments, information that is output from five intermediate layers 810, 820, 830, 840, 850 of the VGG network 660 (or any other number of intermediate layers, such as one, three, seven, ten, etc.) may be aggregated over time by sequences of temporal residual blocks (e.g., 811-815, 821-825, 831-835, 841-845, 851-855) of the discriminator 670. In contrast to the generator 640, the discriminator 670 processes a sequence of frames at once and, therefore, can reason about space-time relations. The temporal residual blocks aggregate information over time by performing one dimensional (1D) convolutions in the temporal domain only. Turning to the example shown in FIG. 8A, the output from the VGG conv1_2 layer 810 may be processed by a temporal residual block 811, which may perform a 1D temporal convolution on the input and then down-sample the spatial dimension while increasing the feature depth. This type of temporal residual block may be referred to as Type A blocks. The same operation is sequentially performed by Type A temporal residual blocks 812, 813, and 814. The output of the last temporal residual block 814 is then processed by another type of temporal residual block 815 that performs temporal convolution without down-sampling. This type of temporal residual block may be referred to as Type B blocks. The output of the Type B block 815 is then combined with outputs associated with other VGG layers (e.g., 820, 830, 840, 850) using a fully connected layer 860.

For each of the other VGG layers, the process is similar but with different numbers of Type A and Type B blocks. For example, the output of VGG conv2_2 820 is spatially smaller than the output of VGG conv1_2 810; therefore, three (rather than four) Type A blocks 821, 822, 823 are used to perform temporal convolution and down-sample until the spatial dimension of the feature map is of the desired, uniform size expected by the Type B blocks. The output of the last Type A block 823 is then processed by a sequence of two Type B blocks 824. As a result, the output of the VGG conv2_2 layer 820 undergoes a sequence of the same number of temporal convolutions (in this example, five) as that of the outputs of other VGG layers (e.g., 810, 830, 840, and 850) before reaching the fully connected layer 860. For example, the output of the VGG conv3_2 layer 830 is processed by a sequence of two Type A blocks 831, 832 and three Type B blocks 833, 834, 835. The output of the VGG conv4_2 layer 840 is processed by a sequence of one Type A block 841 and four Type B blocks 842, 843, 844, 845. The output of the VGG conv5_2 layer 850 is processed by no Type A blocks (since it is already at the desired spatial dimension) but by a sequence of five Type B blocks 851, 852, 853, 854, 855. The outputs of the last Type B block 815, 825, 835, 845, 855 for the five VGG layers 810, 820, 830, 840, 850 are then combined using the fully connected layer 860, and the output of which is processed by an activation layer 861 and then another connected layer 862 to arrive at final scalar critic (e.g., whether the frame is "fake").

FIG. 8B illustrates an embodiment of a Type A temporal residual block 880 (e.g., blocks 811-814, 821-823, 831-832, and 841 shown in FIG. 8A). The Type A temporal residual block 880 takes the input from its preceding block (e.g., the output of a VGG layer or another Type A block 880) and performs temporal convolution 881 (e.g., 1D temporal convolution). The output is then processed by an activation layer 882, and the results of which is added 883 to the original input of this block 880. The aggregated result is then down-sampled 884 in the spatial dimension and output to the next block (e.g., another Type A block 880 or a Type B block 890).

FIG. 8C illustrates an embodiment of a Type B temporal residual block 890 (e.g., blocks 815, 824-825, 833-835, 842-845, and 851-855 shown in FIG. 8A). The Type B temporal residual block 890 takes the input from its preceding block (e.g., the output of a Type A block 880 or another Type B block 890) and performs temporal convolution 891 (e.g., 1D temporal convolution). The output is then processed by an activation layer 892, and the results of which is added 893 to the original input of this block 890 and output to the next block (e.g., another Type B block 890 or the fully connected layer 860). Unlike Type A blocks 880, Type B blocks 890 do not perform down-sampling.

In particular embodiments, the generator 640 and the discriminator 670 described above may be extended to take into consideration data in the temporal domain to better handle temporally coherent sequence of frames and reconstruct it without flicker. In particular embodiments, this may be achieved by either replacing 2D convolutions with 3D convolutions or adding recurrent convolutional layers. For example, with respect to the generator 640, the last convolution layer in each encoder block (e.g., 702-705 in FIG. 7A) may be replaced with a Convolutional LSTM network. For instance, referring to FIG. 7B, the convolution layer 736 in the encoder block 730 may be replaced with a Convolutional LSTM network. With respect to the discriminator 670, all 2D convolution layers may be replaced with 3D convolutional layers. For example, the convolutional layer 881 and 891 in the two types of temporal residual blocks 880 and 890 may be replaced with 3D convolutional layers. The revised generator 640 and discriminator 640 may be trained using natural video sequences (e.g., video sequences captured by a camera, which may include annotations, audio-visual features, etc.) using backpropagation through time (due to recurrent layers). In particular embodiments, images in the minibatch may be replaced with short video sequences. Each short video sequence may be configured to include 16 frames or any other suitable number of frames (e.g., 4, 8, 32, etc.).

Figure 9:
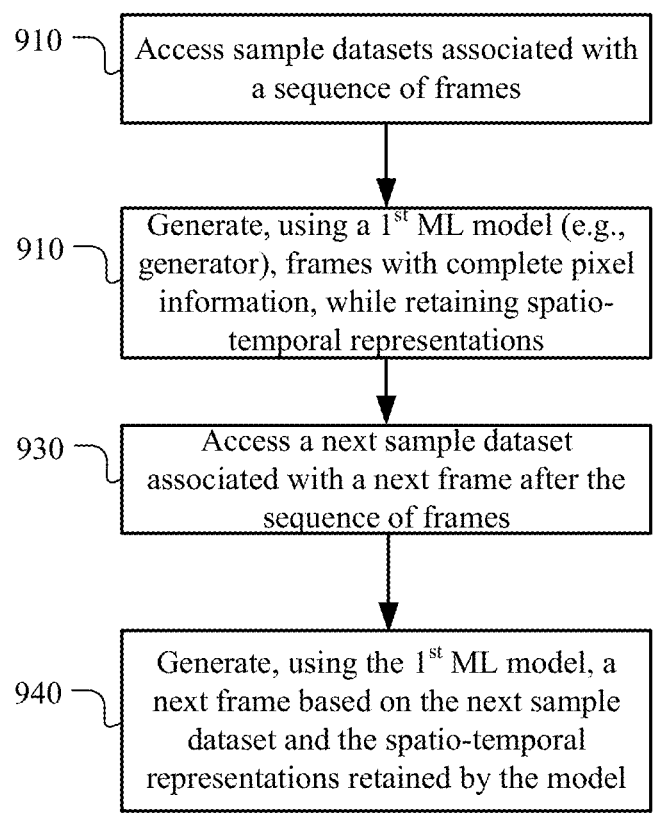
FIG. 9 illustrates an example method for generating completed images from sample datasets using the trained generator machine-learning model, in accordance with particular embodiments.

FIG. 9 illustrates an example method 900 for generating completed images from sample datasets using a trained generator machine-learning model, in accordance with particular embodiments. The process may begin at Step 910, where a computing system may access one or more sample datasets associated with a sequence of one or more frames, respectively. Each of the one or more sample datasets comprises incomplete pixel information of the associated frame (e.g., subsample data is available for some pixels but not all). In particular embodiments, the one or more sample datasets may be generated using a physics-based computer-graphics rendering module (e.g., performing ray tracing or ray casting) or from color sampling from an existing frame with complete color information. For example, a system (which may be the same computing system accessing the sample datasets or a different one) may determine one or more regions of interest within the frame associated with the sample dataset (e.g., subsample locations). The system may then generate the incomplete pixel information using the one or more regions of interest. For example, the system may perform visibility tests and use shading algorithms to determine the color of those regions of interest, or the system may sample the colors at those regions of interests within the existing frame with complete color information. In particular embodiments, each of the one or more sample datasets may include an image with pixel colors (e.g., RGB) corresponding to the incomplete pixel information associated with the sample dataset and a binary mask indicating locations of the pixel colors. The system that generated the sample datasets may then send the sparse data to another system or process the data itself at a later time to reconstruct the full frames.

In particular embodiments, the density of the regions of interest may not be spatially uniform across the sample dataset. For example, one or more portions of the incomplete pixel information corresponding to the one or more regions of interest include denser pixel samples than those of other portions of the incomplete pixel information. In particular embodiments, the density distribution may be based on the user's gaze, since that determines the user's foveal region and/or any applicable optics distortion. For example, the system may determine a gaze direction of a user (e.g., based on eye-tracking data obtained by an eye-tracking device) and determine the one or more regions of interest based on the determined gaze direction of the user.

At Step 920, the system may generate, using a first machine-learning model, the one or more frames based on the one or more sample datasets, wherein each of the one or more generated frames has complete pixel information. The first machine-learning model, such as the generator of a GAN network, is configured to retain spatio-temporal representations associated with the one or more generated frames. In particular embodiments, the first machine-learning model comprises a plurality of encoders and a plurality of decoders (which may be recurrent decoders) that are serially connected (e.g., as shown in the example in FIG. 7A). In particular embodiments, the output of each encoder may be passed to a corresponding matching decoder via a skip connection. For example, the plurality of encoders may include a first encoder and a last encoder, and the plurality of decoders may include a first decoder and a last decoder. The output of the first encoder may be configured to be an input of the last decoder, and the output of the last encoder may be configured to be an input of the first decoder.

At step 930, the system may access a next sample dataset comprising incomplete pixel information of a next frame after the sequence of one or more frames. At step 940, the system may generate, using the first machine-learning model, the next frame based on the next sample dataset. The next frame may have complete pixel information comprising the incomplete pixel information of the next sample dataset and additional pixel information generated based on the next sample dataset and the spatio-temporal representations retained by the first machine-learning model.

In particular embodiments, the aforementioned first machine-learning model may be a generator of a GAN network. In particular embodiments, the generator may be trained as follows. A training system may generate a plurality of training sample datasets from a plurality of training frames, respectively. The system may generate, using the first machine-learning model, a plurality of reconstructed frames based on the plurality of training sample datasets, respectively. The system may then use a second machine-learning model (e.g., a discriminator) to determine the likelihoods of the plurality of reconstructed frames being generated by the first machine-learning model. The system may then update the first machine-learning model based on a correctness (e.g., as measured by adversarial loss) of each of the likelihoods determined by the second machine-learning model. In particular embodiments, the updating of the first machine-learning model may further be based on comparisons between the plurality of reconstructed frames and the plurality of training frames (e.g., content loss).

Figure 10:
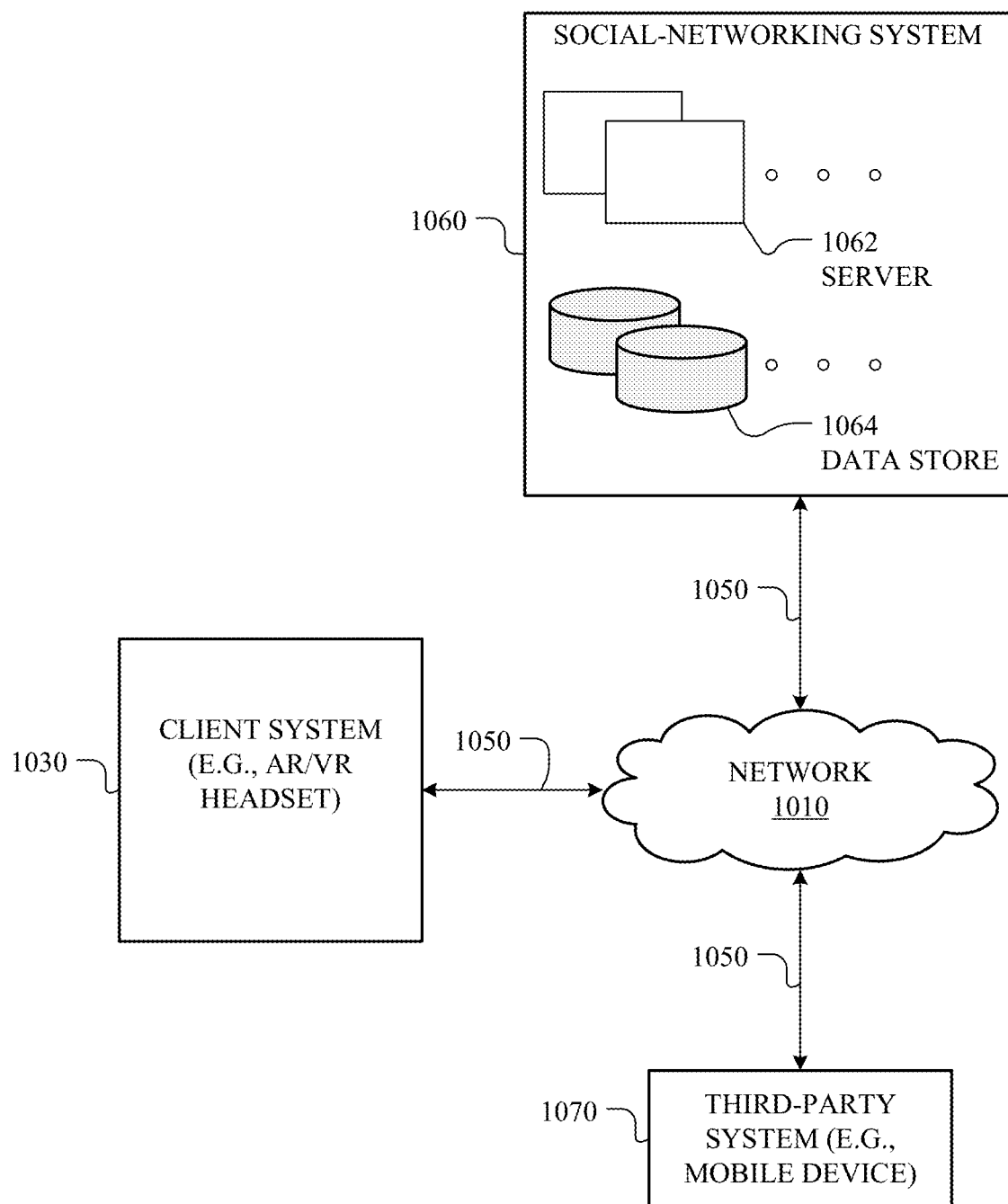
FIG. 10 illustrates an example network environment associated with a social-networking system.

FIG. 10 illustrates an example network environment 1000 associated with a social-networking system. Network environment 1000 includes a client system 1030, a social-networking system 1060, and a third-party system 1070 connected to each other by a network 1010. Although FIG. 10 illustrates a particular arrangement of client system 1030, social-networking system 1060, third-party system 1070, and network 1010, this disclosure contemplates any suitable arrangement of client system 1030, social-networking system 1060, third-party system 1070, and network 1010. As an example and not by way of limitation, two or more of client system 1030, social-networking system 1060, and third-party system 1070 may be connected to each other directly, bypassing network 1010. As another example, two or more of client system 1030, social-networking system 1060, and third-party system 1070 may be physically or logically co-located with each other in whole or in part. For example, an AR/VR headset 1030 may be connected to a local computer or mobile computing device 1070 via short-range wireless communication (e.g., Bluetooth). Moreover, although FIG. 10 illustrates a particular number of client systems 1030, social-networking systems 1060, third-party systems 1070, and networks 1010, this disclosure contemplates any suitable number of client systems 1030, social-networking systems 1060, third-party systems 1070, and networks 1010. As an example and not by way of limitation, network environment 1000 may include multiple client system 1030, social-networking systems 1060, third-party systems 1070, and networks 1010.

This disclosure contemplates any suitable network 1010. As an example and not by way of limitation, one or more portions of network 1010 may include a short-range wireless network (e.g., Bluetooth, Zigbee, etc.), an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 1010 may include one or more networks 1010.

Links 1050 may connect client system 1030, social-networking system 1060, and third-party system 1070 to communication network 1010 or to each other. This disclosure contemplates any suitable links 1050. In particular embodiments, one or more links 1050 include one or more wireline (such as for example Digital Subscriber Line (DSL) or Data Over Cable Service Interface Specification (DOCSIS)), wireless (such as for example Wi-Fi, Worldwide Interoperability for Microwave Access (WiMAX), Bluetooth), or optical (such as for example Synchronous Optical Network (SONET) or Synchronous Digital Hierarchy (SDH)) links. In particular embodiments, one or more links 1050 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 1050, or a combination of two or more such links 1050. Links 1050 need not necessarily be the same throughout network environment 1000. One or more first links 1050 may differ in one or more respects from one or more second links 1050.

In particular embodiments, client system 1030 may be an electronic device including hardware, software, or embedded logic components or a combination of two or more such components and capable of carrying out the appropriate functionalities implemented or supported by client system 1030. As an example and not by way of limitation, a client system 1030 may include a computer system such as a VR/AR headset, desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 1030. A client system 1030 may enable a network user at client system 1030 to access network 1010. A client system 1030 may enable its user to communicate with other users at other client systems 1030.

In particular embodiments, social-networking system 1060 may be a network-addressable computing system that can host an online social network. Social-networking system 1060 may generate, store, receive, and send social-networking data, such as, for example, user-profile data, concept-profile data, social-graph information, or other suitable data related to the online social network. Social-networking system 1060 may be accessed by the other components of network environment 1000 either directly or via network 1010. As an example and not by way of limitation, client system 1030 may access social-networking system 1060 using a web browser, or a native application associated with social-networking system 1060 (e.g., a mobile social-networking application, a messaging application, another suitable application, or any combination thereof) either directly or via network 1010. In particular embodiments, social-networking system 1060 may include one or more servers 1062. Each server 1062 may be a unitary server or a distributed server spanning multiple computers or multiple datacenters. Servers 1062 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 1062 may include hardware, software, or embedded logic components or a combination of two or more such components for carrying out the appropriate functionalities implemented or supported by server 1062. In particular embodiments, social-networking system 1060 may include one or more data stores 1064. Data stores 1064 may be used to store various types of information. In particular embodiments, the information stored in data stores 1064 may be organized according to specific data structures. In particular embodiments, each data store 1064 may be a relational, columnar, correlation, or other suitable database. Although this disclosure describes or illustrates particular types of databases, this disclosure contemplates any suitable types of databases. Particular embodiments may provide interfaces that enable a client system 1030, a social-networking system 1060, or a third-party system 1070 to manage, retrieve, modify, add, or delete, the information stored in data store 1064.

In particular embodiments, social-networking system 1060 may store one or more social graphs in one or more data stores 1064. In particular embodiments, a social graph may include multiple nodes—which may include multiple user nodes (each corresponding to a particular user) or multiple concept nodes (each corresponding to a particular concept)—and multiple edges connecting the nodes. Social-networking system 1060 may provide users of the online social network the ability to communicate and interact with other users. In particular embodiments, users may join the online social network via social-networking system 1060 and then add connections (e.g., relationships) to a number of other users of social-networking system 1060 to whom they want to be connected. Herein, the term "friend" may refer to any other user of social-networking system 1060 with whom a user has formed a connection, association, or relationship via social-networking system 1060.

In particular embodiments, social-networking system 1060 may provide users with the ability to take actions on various types of items or objects, supported by social-networking system 1060. As an example and not by way of limitation, the items and objects may include groups or social networks to which users of social-networking system 1060 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 1060 or by an external system of third-party system 1070, which is separate from social-networking system 1060 and coupled to social-networking system 1060 via a network 1010.

In particular embodiments, social-networking system 1060 may be capable of linking a variety of entities. As an example and not by way of limitation, social-networking system 1060 may enable users to interact with each other as well as receive content from third-party systems 1070 or other entities, or to allow users to interact with these entities through an application programming interfaces (API) or other communication channels.

In particular embodiments, a third-party system 1070 may include a local computing device that is communicatively coupled to the client system 1030. For example, if the client system 1030 is an AR/VR headset, the third-party system 1070 may be a local laptop configured to perform the necessary graphics rendering and provide the rendered results to the AR/VR headset 1030 for subsequent processing and/or display. In particular embodiments, the third-party system 1070 may execute software associated with the client system 1030 (e.g., a rendering engine). The third-party system 1070 may generate sample datasets with sparse pixel information of video frames and send the sparse data to the client system 1030. The client system 1030 may then generate frames reconstructed from the sample datasets.

In particular embodiments, the third-party system 1070 may also include one or more types of servers, one or more data stores, one or more interfaces, including but not limited to APIs, one or more web services, one or more content sources, one or more networks, or any other suitable components, e.g., that servers may communicate with. A third-party system 1070 may be operated by a different entity from an entity operating social-networking system 1060. In particular embodiments, however, social-networking system 1060 and third-party systems 1070 may operate in conjunction with each other to provide social-networking services to users of social-networking system 1060 or third-party systems 1070. In this sense, social-networking system 1060 may provide a platform, or backbone, which other systems, such as third-party systems 1070, may use to provide social-networking services and functionality to users across the Internet.

In particular embodiments, a third-party system 1070 may include a third-party content object provider (e.g., including sparse sample datasets described herein). A third-party content object provider may include one or more sources of content objects, which may be communicated to a client system 1030. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 1060 also includes user-generated content objects, which may enhance a user's interactions with social-networking system 1060. User-generated content may include anything a user can add, upload, send, or "post" to social-networking system 1060. As an example and not by way of limitation, a user communicates posts to social-networking system 1060 from a client system 1030. Posts may include data such as status updates or other textual data, location information, photos, videos, links, music or other similar data or media. Content may also be added to social-networking system 1060 by a third-party through a "communication channel," such as a newsfeed or stream.

In particular embodiments, social-networking system 1060 may include a variety of servers, sub-systems, programs, modules, logs, and data stores. In particular embodiments, social-networking system 1060 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 1060 may also include suitable components such as network interfaces, security mechanisms, load balancers, failover servers, management-and-network-operations consoles, other suitable components, or any suitable combination thereof. In particular embodiments, social-networking system 1060 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 1060 to one or more client systems 1030 or one or more third-party system 1070 via network 1010. The web server may include a mail server or other messaging functionality for receiving and routing messages between social-networking system 1060 and one or more client systems 1030. An API-request server may allow a third-party system 1070 to access information from social-networking system 1060 by calling one or more APIs. An action logger may be used to receive communications from a web server about a user's actions on or off social-networking system 1060. In conjunction with the action log, a third-party-content-object log may be maintained of user exposures to third-party-content objects. A notification controller may provide information regarding content objects to a client system 1030. Information may be pushed to a client system 1030 as notifications, or information may be pulled from client system 1030 responsive to a request received from client system 1030. Authorization servers may be used to enforce one or more privacy settings of the users of social-networking system 1060. A privacy setting of a user determines how particular information associated with a user can be shared. The authorization server may allow users to opt in to or opt out of having their actions logged by social-networking system 1060 or shared with other systems (e.g., third-party system 1070), such as, for example, by setting appropriate privacy settings. Third-party-content-object stores may be used to store content objects received from third parties, such as a third-party system 1070. Location stores may be used for storing location information received from client systems 1030 associated with users. Advertisement-pricing modules may combine social information, the current time, location information, or other suitable information to provide relevant advertisements, in the form of notifications, to a user.

Figure 11:
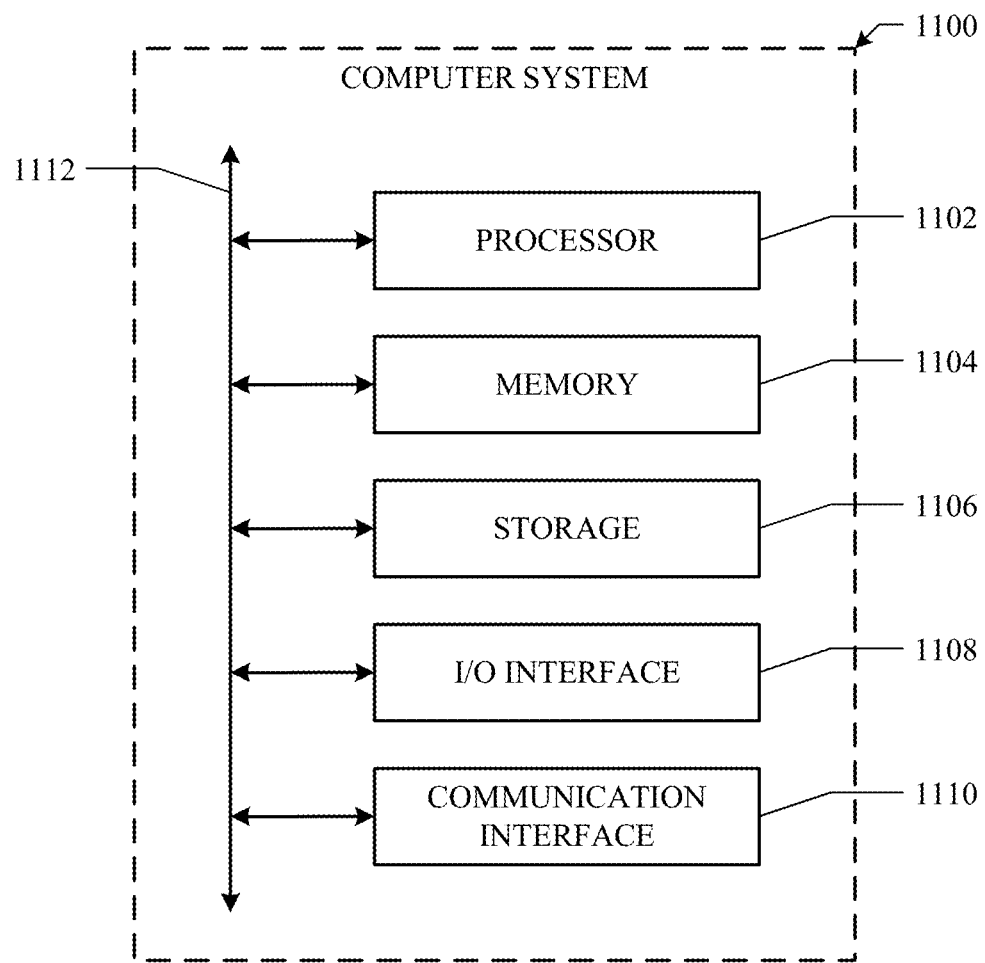
FIG. 11 illustrates an example computer system.

FIG. 11 illustrates an example computer system 1100. In particular embodiments, one or more computer systems 1100 perform one or more steps of one or more methods described or illustrated herein. In particular embodiments, one or more computer systems 1100 provide functionality described or illustrated herein. In particular embodiments, software running on one or more computer systems 1100 performs one or more steps of one or more methods described or illustrated herein or provides functionality described or illustrated herein. Particular embodiments include one or more portions of one or more computer systems 1100. Herein, reference to a computer system may encompass a computing device, and vice versa, where appropriate. Moreover, reference to a computer system may encompass one or more computer systems, where appropriate.

This disclosure contemplates any suitable number of computer systems 1100. This disclosure contemplates computer system 1100 taking any suitable physical form. As example and not by way of limitation, computer system 1100 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1100 may include one or more computer systems 1100; be unitary or distributed; span multiple locations; span multiple machines; span multiple data centers; or reside in a cloud, which may include one or more cloud components in one or more networks. Where appropriate, one or more computer systems 1100 may perform without substantial spatial or temporal limitation one or more steps of one or more methods described or illustrated herein. As an example and not by way of limitation, one or more computer systems 1100 may perform in real time or in batch mode one or more steps of one or more methods described or illustrated herein. One or more computer systems 1100 may perform at different times or at different locations one or more steps of one or more methods described or illustrated herein, where appropriate.

In particular embodiments, computer system 1100 includes a processor 1102, memory 1104, storage 1106, an input/output (I/O) interface 1108, a communication interface 1110, and a bus 1112. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1102 includes hardware for executing instructions, such as those making up a computer program. As an example and not by way of limitation, to execute instructions, processor 1102 may retrieve (or fetch) the instructions from an internal register, an internal cache, memory 1104, or storage 1106; decode and execute them; and then write one or more results to an internal register, an internal cache, memory 1104, or storage 1106. In particular embodiments, processor 1102 may include one or more internal caches for data, instructions, or addresses. This disclosure contemplates processor 1102 including any suitable number of any suitable internal caches, where appropriate. As an example and not by way of limitation, processor 1102 may include one or more instruction caches, one or more data caches, and one or more translation lookaside buffers (TLBs). Instructions in the instruction caches may be copies of instructions in memory 1104 or storage 1106, and the instruction caches may speed up retrieval of those instructions by processor 1102. Data in the data caches may be copies of data in memory 1104 or storage 1106 for instructions executing at processor 1102 to operate on; the results of previous instructions executed at processor 1102 for access by subsequent instructions executing at processor 1102 or for writing to memory 1104 or storage 1106; or other suitable data. The data caches may speed up read or write operations by processor 1102. The TLBs may speed up virtual-address translation for processor 1102. In particular embodiments, processor 1102 may include one or more internal registers for data, instructions, or addresses. This disclosure contemplates processor 1102 including any suitable number of any suitable internal registers, where appropriate. Where appropriate, processor 1102 may include one or more arithmetic logic units (ALUs); be a multi-core processor; or include one or more processors 1102. Although this disclosure describes and illustrates a particular processor, this disclosure contemplates any suitable processor.

In particular embodiments, memory 1104 includes main memory for storing instructions for processor 1102 to execute or data for processor 1102 to operate on. As an example and not by way of limitation, computer system 1100 may load instructions from storage 1106 or another source (such as, for example, another computer system 1100) to memory 1104. Processor 1102 may then load the instructions from memory 1104 to an internal register or internal cache. To execute the instructions, processor 1102 may retrieve the instructions from the internal register or internal cache and decode them. During or after execution of the instructions, processor 1102 may write one or more results (which may be intermediate or final results) to the internal register or internal cache. Processor 1102 may then write one or more of those results to memory 1104. In particular embodiments, processor 1102 executes only instructions in one or more internal registers or internal caches or in memory 1104 (as opposed to storage 1106 or elsewhere) and operates only on data in one or more internal registers or internal caches or in memory 1104 (as opposed to storage 1106 or elsewhere). One or more memory buses (which may each include an address bus and a data bus) may couple processor 1102 to memory 1104. Bus 1112 may include one or more memory buses, as described below. In particular embodiments, one or more memory management units (MMUs) reside between processor 1102 and memory 1104 and facilitate accesses to memory 1104 requested by processor 1102. In particular embodiments, memory 1104 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1104 may include one or more memories 1104, where appropriate. Although this disclosure describes and illustrates particular memory, this disclosure contemplates any suitable memory.

In particular embodiments, storage 1106 includes mass storage for data or instructions. As an example and not by way of limitation, storage 1106 may include a hard disk drive (HDD), a floppy disk drive, flash memory, an optical disc, a magneto-optical disc, magnetic tape, or a Universal Serial Bus (USB) drive or a combination of two or more of these. Storage 1106 may include removable or non-removable (or fixed) media, where appropriate. Storage 1106 may be internal or external to computer system 1100, where appropriate. In particular embodiments, storage 1106 is non-volatile, solid-state memory. In particular embodiments, storage 1106 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1106 taking any suitable physical form. Storage 1106 may include one or more storage control units facilitating communication between processor 1102 and storage 1106, where appropriate. Where appropriate, storage 1106 may include one or more storages 1106. Although this disclosure describes and illustrates particular storage, this disclosure contemplates any suitable storage.

In particular embodiments, I/O interface 1108 includes hardware, software, or both, providing one or more interfaces for communication between computer system 1100 and one or more I/O devices. Computer system 1100 may include one or more of these I/O devices, where appropriate. One or more of these I/O devices may enable communication between a person and computer system 1100. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1108 for them. Where appropriate, I/O interface 1108 may include one or more device or software drivers enabling processor 1102 to drive one or more of these I/O devices. I/O interface 1108 may include one or more I/O interfaces 1108, where appropriate. Although this disclosure describes and illustrates a particular I/O interface, this disclosure contemplates any suitable I/O interface.

In particular embodiments, communication interface 1110 includes hardware, software, or both providing one or more interfaces for communication (such as, for example, packet-based communication) between computer system 1100 and one or more other computer systems 1100 or one or more networks. As an example and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1110 for it. As an example and not by way of limitation, computer system 1100 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1100 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1100 may include any suitable communication interface 1110 for any of these networks, where appropriate. Communication interface 1110 may include one or more communication interfaces 1110, where appropriate. Although this disclosure describes and illustrates a particular communication interface, this disclosure contemplates any suitable communication interface.

In particular embodiments, bus 1112 includes hardware, software, or both coupling components of computer system 1100 to each other. As an example and not by way of limitation, bus 1112 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1112 may include one or more buses 1112, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing system:
    accessing one or more sample datasets associated with a sequence of one or more frames, respectively, wherein each of the one or more sample datasets comprises incomplete pixel information of the associated frame;
    generating, using a first machine-learning model, the one or more frames based on the one or more sample datasets, wherein each of the one or more generated frames has complete pixel information, wherein the first machine-learning model is configured to retain spatio-temporal representations associated with the one or more generated frames;
    accessing a next sample dataset comprising incomplete pixel information of a next frame after the sequence of one or more frames; and
    generating, using the first machine-learning model, the next frame based on the next sample dataset, wherein the next frame has complete pixel information comprising the incomplete pixel information of the next sample dataset and additional pixel information generated based on the next sample dataset and the spatio-temporal representations retained by the first machine-learning model.

2. The method of claim 1, wherein the first machine-learning model is trained by:
    generating a plurality of training sample datasets from a plurality of training frames, respectively;
    generating, using the first machine-learning model, a plurality of reconstructed frames based on the plurality of training sample datasets, respectively;
    determining, using a second machine-learning model, likelihoods of the plurality of reconstructed frames being generated by the first machine-learning model; and
    updating the first machine-learning model based on a correctness of each of the likelihoods determined by the second machine-learning model.

3. The method of claim 2, wherein the updating of the first machine-learning model is further based on comparisons between the plurality of reconstructed frames and the plurality of training frames.

4. The method of claim 1,
    wherein the first machine-learning model comprises a plurality of encoders and a plurality of decoders that are serially connected, the plurality of encoders comprising a first encoder and a last encoder and the plurality of decoders comprising a first decoder and a last decoder;
    wherein an output of the first encoder is configured to be an input of the last decoder; and
    wherein an output of the last encoder is configured to be an input of the first decoder.

5. The method of claim 4, wherein the plurality of decoders are recurrent decoders.

6. The method of claim 1, further comprising:
    generating the one or more sample datasets using a physics-based computer-graphics rendering module.

7. The method of claim 6, wherein the generation of at least one of the one or more sample datasets comprises:
    determining one or more regions of interest within the frame associated with the sample dataset;
    generating the incomplete pixel information using the one or more regions of interest;
    wherein one or more portions of the incomplete pixel information corresponding to the one or more regions of interest include denser pixel samples than those of other portions of the incomplete pixel information.

8. The method of claim 7, further comprising:
    determining a gaze direction of a user based on eye-tracking data obtained by an eye-tracking device;
    wherein the determining of the one or more regions of interest is based on the determined gaze direction of the user.

9. The method of claim 1, wherein each of the one or more sample datasets comprises:
- an image with pixel colors corresponding to the incomplete pixel information associated with the sample dataset; and
- a binary mask indicating locations of the pixel colors.

10. One or more computer-readable non-transitory storage media embodying software that is operable when executed to:
- access one or more sample datasets associated with a sequence of one or more frames, respectively, wherein each of the one or more sample datasets comprises incomplete pixel information of the associated frame;
- generate, using a first machine-learning model, the one or more frames based on the one or more sample datasets, wherein each of the one or more generated frames has complete pixel information, wherein the first machine-learning model is configured to retain spatio-temporal representations associated with the one or more generated frames;
- access a next sample dataset comprising incomplete pixel information of a next frame after the sequence of one or more frames; and
- generate, using the first machine-learning model, the next frame based on the next sample dataset, wherein the next frame has complete pixel information comprising the incomplete pixel information of the next sample dataset and additional pixel information generated based on the next sample dataset and the spatio-temporal representations retained by the first machine-learning model.

11. The media of claim 10, wherein the first machine-learning model is trained by a process comprising:
- generating a plurality of training sample datasets from a plurality of training frames, respectively;
- generating, using the first machine-learning model, a plurality of reconstructed frames based on the plurality of training sample datasets, respectively;
- determining, using a second machine-learning model, likelihoods of the plurality of reconstructed frames being generated by the first machine-learning model; and
- updating the first machine-learning model based on a correctness of each of the likelihoods determined by the second machine-learning model.

12. The media of claim 11, wherein the updating of the first machine-learning model is further based on comparisons between the plurality of reconstructed frames and the plurality of training frames.

13. The media of claim 10,
- wherein the first machine-learning model comprises a plurality of encoders and a plurality of decoders that are serially connected, the plurality of encoders comprising a first encoder and a last encoder and the plurality of decoders comprising a first decoder and a last decoder;
- wherein an output of the first encoder is configured to be an input of the last decoder; and
- wherein an output of the last encoder is configured to be an input of the first decoder.

14. The media of claim 13, wherein the plurality of decoders are recurrent decoders.

15. The media of claim 10, wherein the software is further operable when executed to:
- generate the one or more sample datasets using a physics-based computer-graphics rendering module.

16. A system comprising: one or more processors; and one or more computer-readable non-transitory storage media coupled to one or more of the processors and comprising instructions operable when executed by one or more of the processors to cause the system to:
- access one or more sample datasets associated with a sequence of one or more frames, respectively, wherein each of the one or more sample datasets comprises incomplete pixel information of the associated frame;
- generate, using a first machine-learning model, the one or more frames based on the one or more sample datasets, wherein each of the one or more generated frames has complete pixel information, wherein the first machine-learning model is configured to retain spatio-temporal representations associated with the one or more generated frames;
- access a next sample dataset comprising incomplete pixel information of a next frame after the sequence of one or more frames; and
- generate, using the first machine-learning model, the next frame based on the next sample dataset, wherein the next frame has complete pixel information comprising the incomplete pixel information of the next sample dataset and additional pixel information generated based on the next sample dataset and the spatio-temporal representations retained by the first machine-learning model.

17. The system of claim 16, wherein the first machine-learning model is trained by a process comprising:
- generating a plurality of training sample datasets from a plurality of training frames, respectively;
- generating, using the first machine-learning model, a plurality of reconstructed frames based on the plurality of training sample datasets, respectively;
- determining, using a second machine-learning model, likelihoods of the plurality of reconstructed frames being generated by the first machine-learning model; and
- updating the first machine-learning model based on a correctness of each of the likelihoods determined by the second machine-learning model.

18. The system of claim 17, wherein the updating of the first machine-learning model is further based on comparisons between the plurality of reconstructed frames and the plurality of training frames.

19. The system of claim 16,
- wherein the first machine-learning model comprises a plurality of encoders and a plurality of decoders that are serially connected, the plurality of encoders comprising a first encoder and a last encoder and the plurality of decoders comprising a first decoder and a last decoder;
- wherein an output of the first encoder is configured to be an input of the last decoder; and
- wherein an output of the last encoder is configured to be an input of the first decoder.

20. The system of claim 16, wherein the one or more computer-readable non-transitory storage media further comprise instructions operable when executed by one or more of the processors to cause the system:
- generate the one or more sample datasets using a physics-based computer-graphics rendering module.

* * * * *